US012529591B1

(12) United States Patent
Sadanand et al.

(10) Patent No.: US 12,529,591 B1
(45) Date of Patent: Jan. 20, 2026

(54) LOAD CELL COMPENSATION FOR MOBILE APPARATUSES

(71) Applicant: Amazon Technologies, Inc., Seattle, WA (US)

(72) Inventors: Sreemanananth Sadanand, Shrewsbury, MA (US); Jacob A. Siegel, Southborough, MA (US); Kenneth Delpapa, Natick, MA (US); Jonathan David Jones, Arlington, VA (US); Nicholas Franklin, Northborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 18/141,299

(22) Filed: Apr. 28, 2023

(51) Int. Cl.
*G01G 19/415* (2006.01)
*G06Q 30/0283* (2023.01)

(52) U.S. Cl.
CPC ....... *G01G 19/415* (2013.01); *G06Q 30/0283* (2013.01)

(58) Field of Classification Search
CPC .......................... G01G 19/415; G06Q 30/0283
USPC ........................................................... 177/3
See application file for complete search history.

(56) References Cited

U.S. PATENT DOCUMENTS

| 7,199,709 | B2 * | 4/2007 | Parsons ................. B62B 3/1404 |
| | | | 340/568.5 |
| 9,117,106 | B2 | 8/2015 | Dedeoglu et al. |
| 9,235,928 | B2 | 1/2016 | Medioni et al. |
| 9,366,588 | B2 * | 6/2016 | Lee ............................. G01L 1/26 |
| 9,473,747 | B2 | 10/2016 | Kobres et al. |
| 10,745,039 | B1 * | 8/2020 | Gao .................... G01G 19/4144 |
| 11,321,665 | B2 * | 5/2022 | Fleischmann ........ G06Q 10/087 |
| 11,453,426 | B2 * | 9/2022 | Gao .................... G01G 19/4144 |
| 11,734,663 | B2 * | 8/2023 | Teraoka ................. G01B 21/22 |
| | | | 705/23 |
| 11,884,315 | B1 * | 1/2024 | Burch ................... B62B 3/1416 |
| 2013/0284806 | A1 | 10/2013 | Margalit |
| 2022/0067688 | A1 * | 3/2022 | Patel ....................... G06N 3/045 |

* cited by examiner

*Primary Examiner* — Jacques M Saint Surin
(74) *Attorney, Agent, or Firm* — Kilpatrick Townsend & Stockton LLP

(57) ABSTRACT

This disclosure describes, in part, systems and techniques for determining compensation models to adjust load cell data and ensure accuracy of the load cells on a mobile apparatus through changing environments and conditions. This disclosure relates, specifically, to generating a compensation model by gathering sensor data for known weights of items over a range of weights, locations, temperatures, and humidity values and building a compensation model to infer compensation error to apply to the estimated weight data from the load cells. The compensation model can be used by a fleet of carts to infer weights of items in a manner accurate enough for sale-by-weight of items.

20 Claims, 9 Drawing Sheets

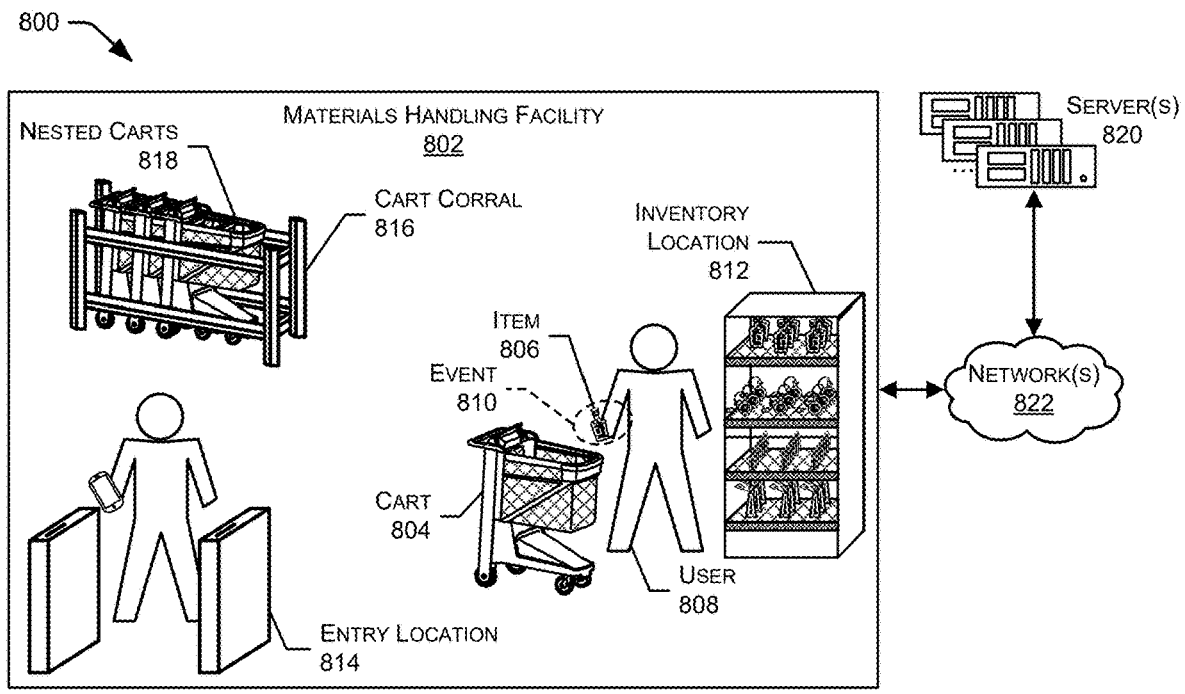
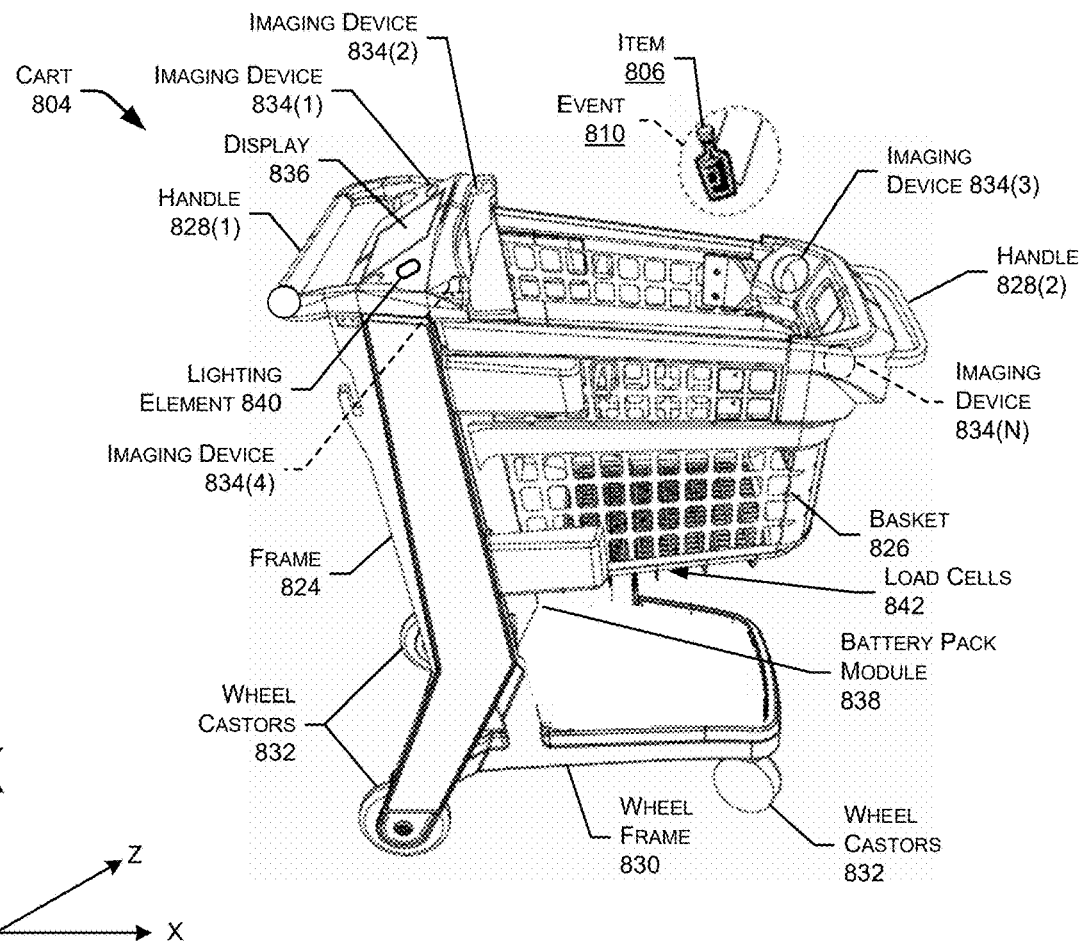
FIG. 8

LOAD CELL COMPENSATION FOR MOBILE APPARATUSES

BACKGROUND

Retail stores maintain an inventory of items in customer-accessible areas such that customers can pick items from the inventory for purchase, rental, and so forth. For example, a customer may take items from shelves located within the store and place the items in a shopping cart. When the customer is finished identifying and retrieving the items, the customer may transport the items, using the shopping cart, to a check-out destination within the store, such as a cashier or dedicated self-checkout stand. In some circumstances, the shopping cart may include sensors, such as cameras and weight sensors, that are configured to determine the items that are placed into the shopping cart by the customer. In these circumstances, the shopping cart may then update a list of items for the customer, display the list of items to the customer, and/or send the list of items to a system for processing of a transaction for the items.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8 illustrates an example environment of a materials handling facility that includes an item-identifying cart to identify items placed in, and removed from, a basket of the cart by a user, according to at least one example.

DETAILED DESCRIPTION

Figure 1:
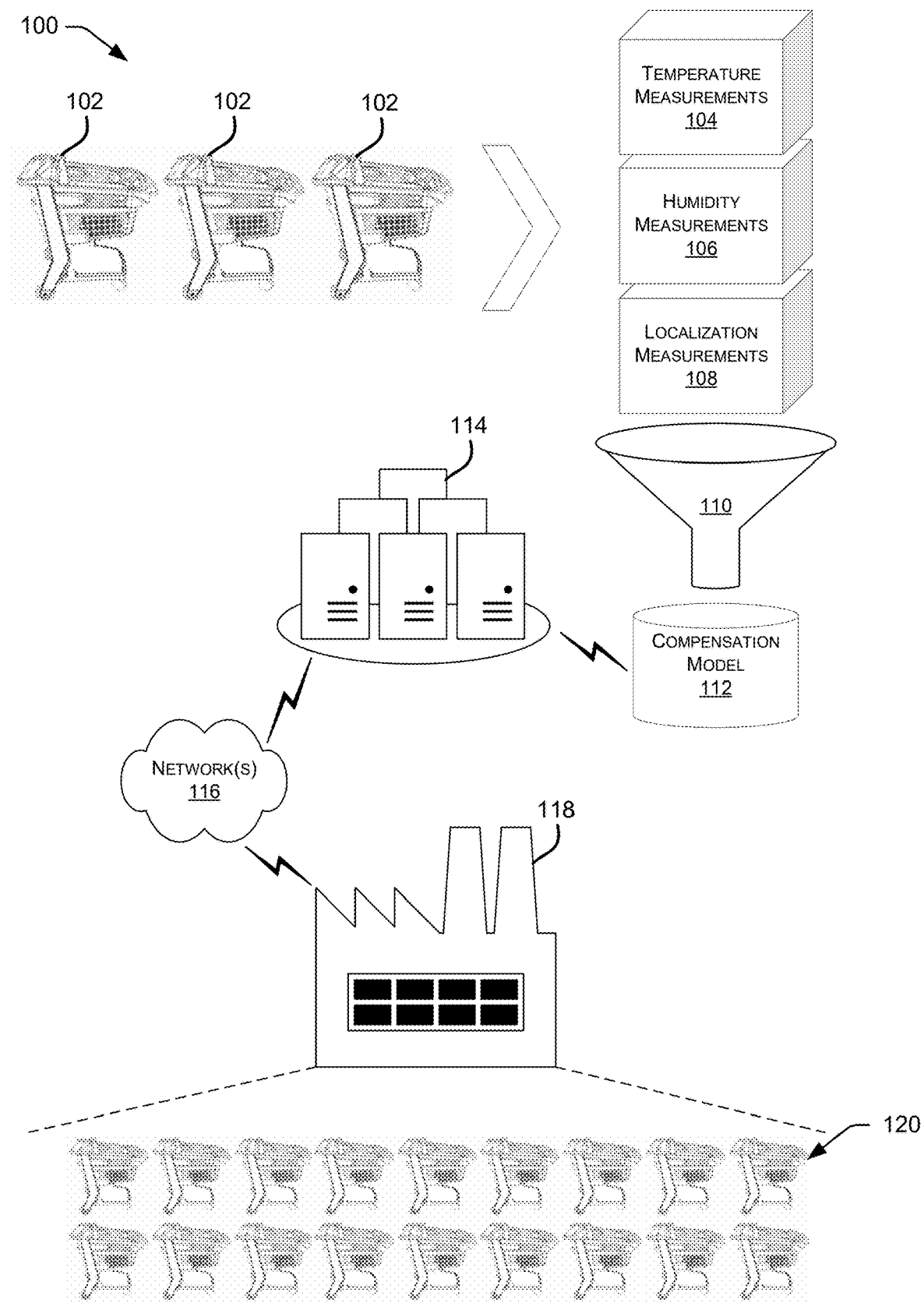
FIG. 1 illustrates an example system for determining and implementing a compensation model for a fleet of mobile apparatuses, according to at least one example.

This disclosure describes, in part, systems for compensating for temperature, humidity, weight location, and other induced errors in weight estimates generated by a weight scale of a mobile apparatus. The mobile apparatus, as described herein may include a smart shopping cart, equipped with sensors (e.g., weight sensors and/or load cells) for determining identities and quantities and/or weights of items from a facility. Though described herein, in some examples, with respect to shopping carts and/or particular environments, the techniques described herein may be implemented on any device that may traverse or experience changes in environment and/or weight placement with respect to load cells. Accordingly, those with skill in the art will appreciate other devices, systems, and environments beyond those explicitly mentioned herein that may implement the systems and techniques described herein.

The mobile apparatus is equipped with weight sensors (e.g., load cells) that are used to measure the weight of the items placed in the basket. The weight sensors serve an important customer facing requirement of facilitating sale by weight purchases onboard the mobile apparatus. Sale by weight items may include fresh produce (fruits and vegetables) and have a price per unit weight associated with them. During shopping, customers weigh produce items in the basket scale and are charged by the weight measured on the scale. As a result, the provider associated with the mobile apparatus is required to ensure accuracy of the weight scale on the mobile apparatus.

In particular, this description relates to compensation models for temperature, humidity, and localization-based induced errors in weight estimates generated by on-device weight scales in the mobile apparatus. The systems model the expected error in the weight estimate in response to a pre-existing load on the scale and the ambient temperature/humidity of the surroundings that the mobile apparatus is situated in and/or the location within a basket of the mobile apparatus where the load is placed. The systems and techniques involved include a statistical data modeling process that acts as a predictor of induced scale error. The systems and techniques us an approach that trains or generates a compensation model based on a subset of mobile apparatuses and applies the compensation model to a fleet of mobile apparatuses. This enables the system to reduce the complexity of a calibration or compensation process which would otherwise require every instance of the scale to be calibrated jointly across temperatures, humidity ranges, and load locations. Such a calibration or compensation would be infeasible due to resource and scalability constraints. Accordingly, the present solution enables the system to accurately compensate for such induced errors without expending undue time and/or exhaustive testing.

The mobile apparatus described herein includes a load cell (or set of load cells) that may be certified for operation as a Sell-By-Weight scale in various jurisdictions, such as NTEP certification. In order to meet certification requirements for selling items by weight, the weight sensors (e.g., load cells) of the mobile apparatus must meet particular accuracy constraints. Due to the possibility of changing conditions and loading on the weight sensors, the mobile apparatus may be susceptible to induced errors as a result of changing temperature, humidity, and/or load placements.

In order to be certified as an operator of a Sell-By-Weight scale in the United States and Europe, the mobile apparatus may be required to be NTEP and OIML certified. NTEP and OIML certification provides confidence that a device will be manufactured in accordance with International standards as adopted by NCWM (National Conference on Weights and Measures, USA) and the International Organization of Legal Metrology (Organisation Internationale de Métrologie Légale, Europe) respectively. As part of the NTEP and OIML certification process, the scale is required to be compliant at all values of ambient temperature and relative humidity in the carts operating range (e.g., 0 degrees Celsius (C) to 40 degrees C. and 0%-100% RH (Relative Humidity).

In order to be NTEP certified, each scale is required to be accurate within specific error tolerances across a particular load spectrum (e.g., 0-50 pounds), temperature spectrum (e.g., 0-40 Celsius) and relative humidity range (0%-85%) that the scale is certified to operate in. An existing and/or typical calibration process at room temperature may be unable to capture the gain change in scale output caused due to changing ambient temperature and humidity. Additionally, the scale output may not be adapted to accurately reflect the weight when items are placed at an extreme corner or edge of the basket of the mobile apparatus. As a result, many typical scales are incapable of adhering to the required accuracy constraints across the required operating temperature and humidity ranges.

Accordingly, the systems and techniques herein involve predicting an expected error in a weight estimation from the weight sensor as a function of the load, temperature, and/or humidity. The expected error may be applied to the weight estimation as a correction factor to produce a compensated weight that may be used for sale by weight and/or more accurate item identification based on item weights. The systems and techniques may apply a correction factor and/or output a corrected weight from a machine learning model in response to detection of the environmental conditions, weight estimate from the weight sensor, and determination of the load location. In some examples, the correction factor may be modeled as an OLS (Ordinary Least Squares) regressor that predicts error in the weight estimate as a function of the temperature, humidity, and any pre-existing load on the scale.

The compensation model may be generated during a generation phase that may be performed using a small subset of mobile apparatuses that are calibrated and shown to be accurate to the required tolerances required for particular certifications. This small subset of mobile apparatuses can be tested through temperature and humidity-controlled environments to set conditions. At each set condition an array of weight measurements (e.g., from 0 lbs. up to 50 lbs. and back to 0 lbs.) in predefined intervals. These measurements may be performed made multiple times on each mobile apparatus at each temperature/humidity set-point to generate a population of weight measurements that reflect the behavior of the scale at the given temperature. This dataset may be used to build a compensation model that can be used to interpolate and/or infer compensation for weight estimates in mobile apparatuses. The compensation model may be deployed from the small subset of mobile apparatuses to a fleet of mobile apparatuses without requiring testing on each mobile device.

Figure 5:
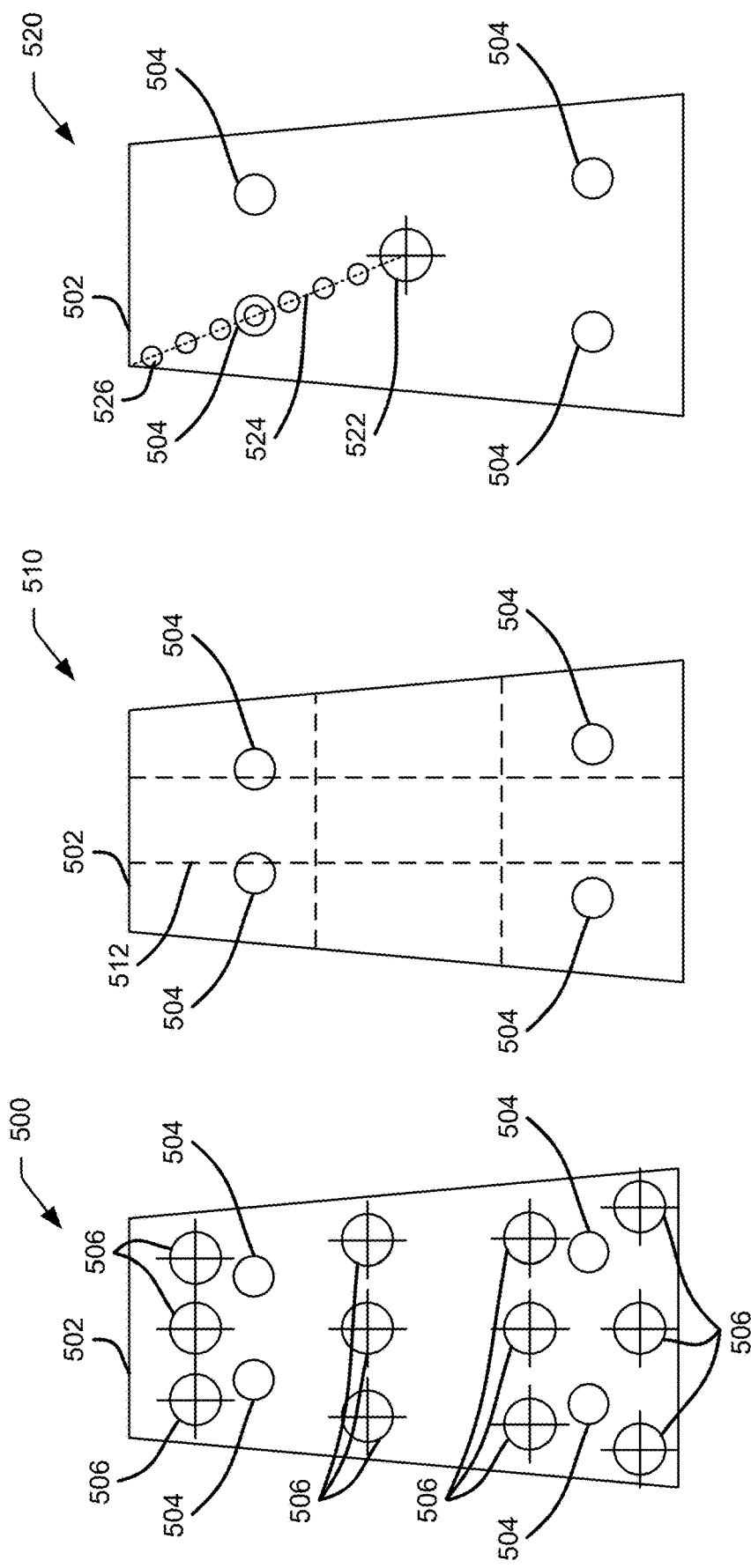
FIGS. 5A-5C illustrate example layouts of baskets of mobile apparatuses for determining a localization compensation model, according to at least one example.

During inference (e.g., after deployment of the generated compensation model to a fleet of carts) the systems and techniques described herein provide for receiving an initial weight estimate from the load cells of the mobile apparatus (e.g., for four load cells as shown in FIGS. 5A-5C) using calibration coefficients. The initial weight estimate may then be compensated by apply a correction factor computed as a function of the initial weight estimate, ambient temperature, ambient humidity, and/or load location with respect to the load cells, as determined based on sensors of the mobile apparatus. The resulting compensated weight estimate is accurate to NTEP/OIML requirements over the operating temperature, humidity, and load range.

For load localization compensation, the systems and techniques herein provide for compensation of the weight data due to off-center (eccentric) excitation of the scale platform. One of the requirements for scale certification in the US (NTEP) and EU (OIML) is for the scale to be accurate within prescribed tolerances when measured at each of the 4 corners of the scale platform. In the instance of the mobile apparatus, the scale includes the basket and two or more (e.g., 4) load cells (as shown in FIGS. 5A-5C). Eccentric excitation of the scale causes the load to be distributed non-uniformly across the load cells and may introduce gain error due to shearing and/or bending of the scale platform (basket).

The compensation model may be trained and/or developed to learn empirically the distribution of error in estimating weight at any given (X,Y) location on the scale platform in order to compensate the estimate weight with a corrective factor that brings the mobile apparatus within NTEP/OIML tolerance. The compensation model may use the ordinary least squares regression model trained to predict scale error as a function of pre-existing load and the location of the load placement on the scale. In order to learn the relationship, the scale may be loaded at pre-defined positions across the bottom of the basket. For each position, varying loads (known and predetermined) may be placed and the uncompensated weight estimated by the scale may be recorded for each location and weight value. An error may be determined based on the known weights (predetermined weight) and the uncompensated estimate. The error may then be used to regress the error in the uncompensated weight estimate and location coordinates of the weight placement.

During inference, the compensation model may take in the load cell signals and computes a center of mass (and/or center of gravity) of the load placed on the scale. The center of mass before the load is placed and after the load is placed may be used to determine the center of mass for the load that is placed on the scale. The location information may then be fed into the compensation model along with the uncompensated weight estimate to compute a correction factor. This correction factor may then be added or subtracted from the uncompensated weight to give a location invariant weight estimate.

The compensation model differs from the calibration of the scale. Scale calibration corresponds to learning a transfer function from raw load cell output to weight predictions and is learned online on each mobile apparatus. The process involves placing a predefined weight at different locations on the mobile apparatus, recording the load cell output and solving a multiple linear regression problem to predict weights based on load cell output. Since the transfer function maps raw load cell output to weight, it is specific to the mobile apparatus. The compensation model may be applied to any of the mobile apparatuses because the compensation model is not specific to the mobile apparatus in the same way that the calibration is specific. Instead, the compensation model may be generated for a fleet of mobile apparatuses having a shared hardware architecture. In such examples, the expectation is that since all the mobile apparatuses in the fleet are built with the same materials and hence have similar thermal properties and responses to the changing environmental conditions. Accordingly, the compensation model may be abstracted away from the raw load cell output and therefore generalized across all mobile apparatuses in the fleet.

Turning now to the figures, FIG. 1 illustrates a system 100 for determining and implementing a compensation model for a fleet 120 of mobile apparatuses 102, according to at least one example. The mobile apparatuses 102 that make up the fleet 120 may include a smart shopping cart, equipped with sensors (e.g., weight sensors and/or load cells) for determining identities and quantities and/or weights of items from a facility. Though described herein, in some examples, with respect to shopping carts and/or particular environments, the techniques described herein may be implemented on any device that may traverse or experience changes in environment and/or weight placement with respect to load cells. Accordingly, those with skill in the art will appreciate other devices, systems, and environments beyond those explicitly mentioned herein that may implement the systems and techniques described herein.

The mobile apparatuses 102 is equipped with weight sensors (e.g., load cells) that are used to measure the weight of the items placed in the basket. The weight sensors serve an important customer facing requirement of facilitating sale by weight purchases onboard the mobile apparatus 102. Sale by weight items may include fresh produce (fruits and vegetables) and have a price per unit weight associated with them. During shopping, customers weigh produce items in the basket scale and are charged by the weight measured on the scale. As a result, the provider associated with the mobile apparatus 102 is required to ensure accuracy of the weight scale on the mobile apparatus 102.

The mobile apparatuses 102 may be used to generate a compensation model 112 through temperature measurements 104, humidity measurements 106, and localization measurements 108. Though described with respect to these particular exposures and environments, the systems and techniques herein may be applied to other types of environmental and/or other changes that may impact the efficacy and induce errors in the load cells of the mobile apparatus 102. The testing may be used to train 110 the compensation model 112 such that the compensation model 112 may be deployed on a fleet 120 or multiple fleets of mobile apparatuses 102.

The temperature measurements 104 may be generated during a generation phase that may be performed using a small subset of mobile apparatuses 102 that are calibrated and shown to be accurate to the required tolerances required for particular certifications. This small subset of mobile apparatuses 102 can be tested through temperature-controlled environments to set conditions. At each set condition an array of weight measurements (e.g., from 0 lbs. up to 50 lbs. and back to 0 lbs.) may be applied to the basket in predefined intervals. These measurements may be performed made multiple times on each mobile apparatus 102 in the subset at each temperature set-point to generate a population of weight measurements that reflect the behavior of the scale at the given temperature. This dataset may be used to build the compensation model 112 that can be used to interpolate and/or infer compensation for weight estimates in mobile apparatuses 102 within a facility 118. The compensation model 112 may be deployed from the small subset of mobile apparatuses 102 to a fleet 120 of mobile apparatuses without requiring testing on each mobile apparatus.

The humidity measurements 106 may be generated during a generation phase that may be performed using the small subset of mobile apparatuses 102. This small subset of mobile apparatuses can be tested through a humidity-controlled environment to set conditions (e.g., particular intervals of relative and/or absolute humidity). At each set-point an array of weight measurements (e.g., from 0 lbs. up to 50 lbs. and back to 0 lbs.) may be applied to the basket in predefined intervals. These measurements may be performed multiple times on each mobile apparatus 102 at each humidity set-point to generate a population of weight measurements that reflect the behavior of the scale at the given humidity. This dataset, along with the temperature dataset from the temperature testing 104, may be used to build the compensation model 112 that can be used to interpolate and/or infer compensation for weight estimates in the fleet 120. The compensation model 112 may be deployed from the small subset of mobile apparatuses 102 to the fleet 120 of mobile apparatuses without requiring testing on each mobile apparatus.

The localization measurements 108 may generate data for compensation of the weight data due to off-center (eccentric) excitation of the load platform (e.g., basket). Eccentric excitation of the scale causes the load to be distributed non-uniformly across the load cells and may introduce gain error due to shearing and/or bending of the scale platform (basket). The compensation model 112 may be trained and/or developed to learn empirically the distribution of error in estimating weight at any given (X,Y) location on the scale platform in order to compensate the estimate weight with a corrective factor that brings the mobile apparatus 102 within NTEP/OIML tolerance. The compensation model 112 may use the ordinary least squares regression model trained to predict scale error as a function of pre-existing load and the location of the load placement on the scale. In order to learn the relationship, the scale may be loaded at pre-defined positions across the bottom of the basket. For each position, varying loads (known and predetermined) may be placed and the uncompensated weight estimated by the scale may be recorded for each location and weight value. An error may be determined based on the known weights (predetermined weight) and the uncompensated estimate. The error may then be used to regress the error in the uncompensated weight estimate and location coordinates of the weight placement.

The compensation model 112 may be generated for a particular set of hardware and may be implemented on any fleet 120 that uses the same hardware, across different facilities 118 and/or use cases. The compensation model 112 may be stored on a computing device 114 in communication with a facility 118 and/or fleet 120 of mobile apparatuses over network(s) 116. The computing device 114 may include any type of computing system including server(s), cloud computing systems, and computing devices of all types. In some examples, the computing device 114 may be local to the facility 118. In some examples, the computing device 114 may be remote from the facility 118 and may connect, over network(s) 116 to multiple different facilities that have individual fleets of mobile apparatuses.

The network(s) 116 may include any suitable network for communications between devices of the system 100. The network(s) 116 may include the internet, wired, and/or wireless communication channels.

During use of the compensation model 112 (e.g., after deployment of the generated compensation model to the fleet 120) the compensation model may be used to receive an initial weight estimate from the load cells of the mobile apparatuses 102 using calibration coefficients and then to compensate by applying a correction factor computed as a function of the initial weight estimate, ambient temperature, ambient humidity, and/or load location with respect to the weight sensors of the mobile apparatus 102. The resulting compensated weight estimate is accurate to NTEP/OIML requirements over the operating temperature, humidity load location, and load range.

In some examples, the compensation model 112 may be implemented on the mobile apparatuses 102 within the fleet 120 such that the compensation model 112 may be employed on-board for calculations of weight estimations for items placed in the basket of the mobile apparatus without requiring a network connection to the computing device 114.

The compensation model 112 may be used to compensate the weight sensor data based on the temperature and/or humidity changes experienced by the mobile apparatuses 102. The compensation model 112 can also be used to compensate for the localization of the load within the basket. For example, the compensation model 112 may be used to compensate the weight data after calculating the location for the load within the basket. The location for the basket may be determined based on the center of mass (and/or center of gravity) of the load placed on the scale. The center of mass before the load is placed and after the load is placed may be used to determine the center of mass for the load that is placed on the scale. The location information may then be fed into the compensation model along with the uncompensated weight estimate to compute a correction factor. This correction factor may then be added or subtracted from the uncompensated weight to give a location invariant weight estimate.

Figure 2:
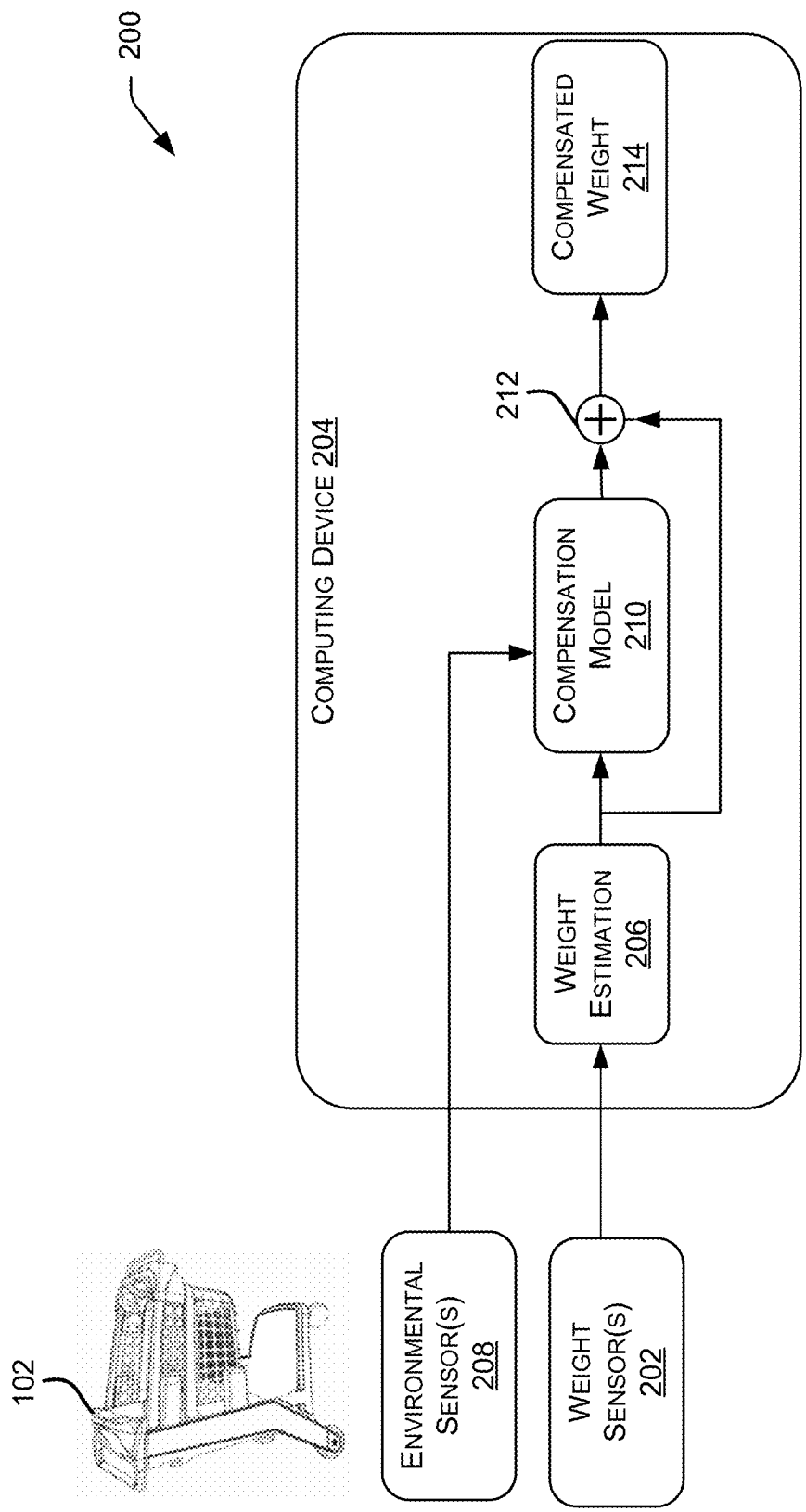
FIG. 2 illustrates an example system for a compensation model on a mobile apparatus, according to at least one example.
Figure 3:
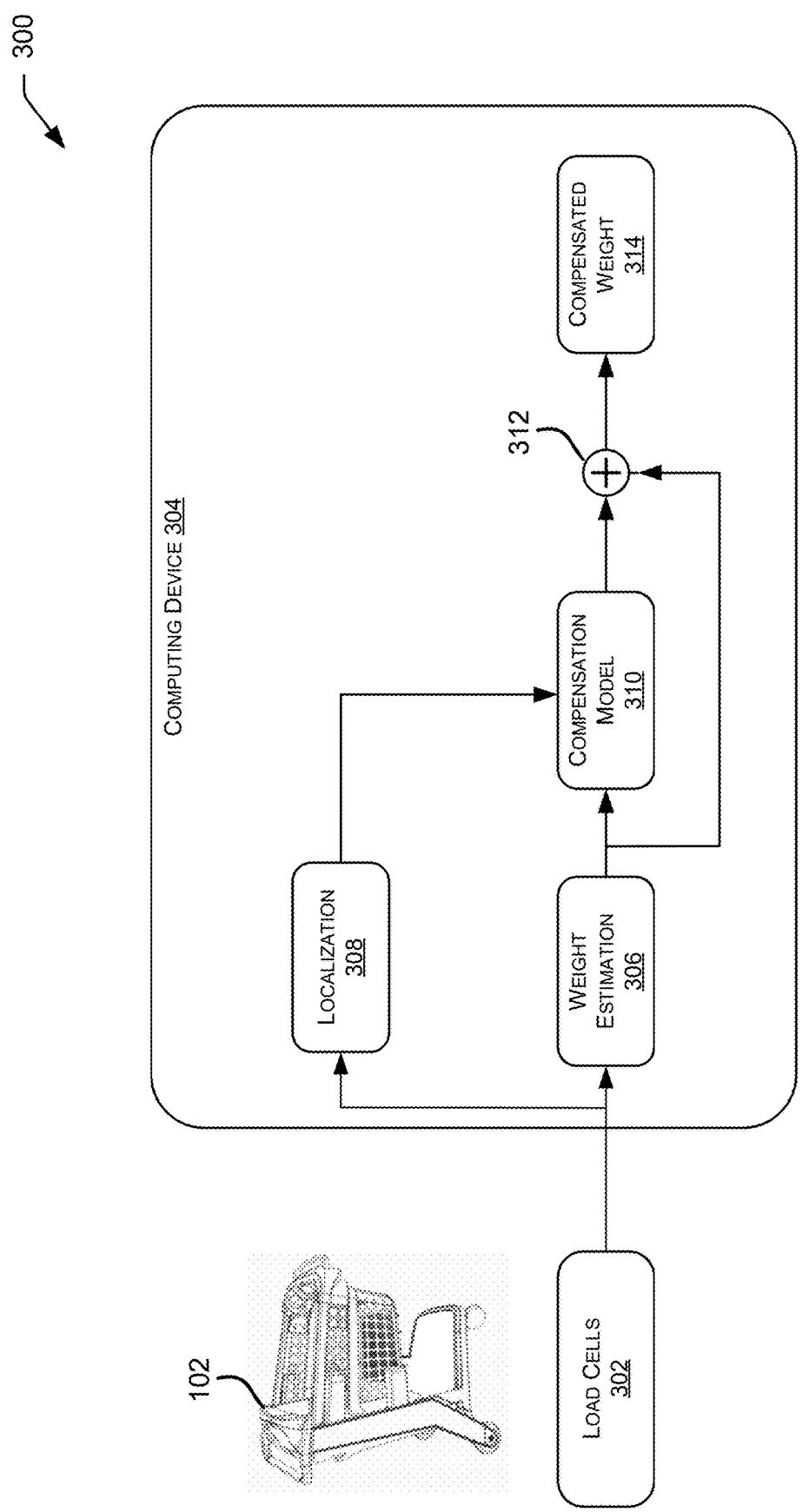
FIG. 3 illustrates an example system for a localization compensation model on a mobile apparatus, according to at least one example.
Figure 4:
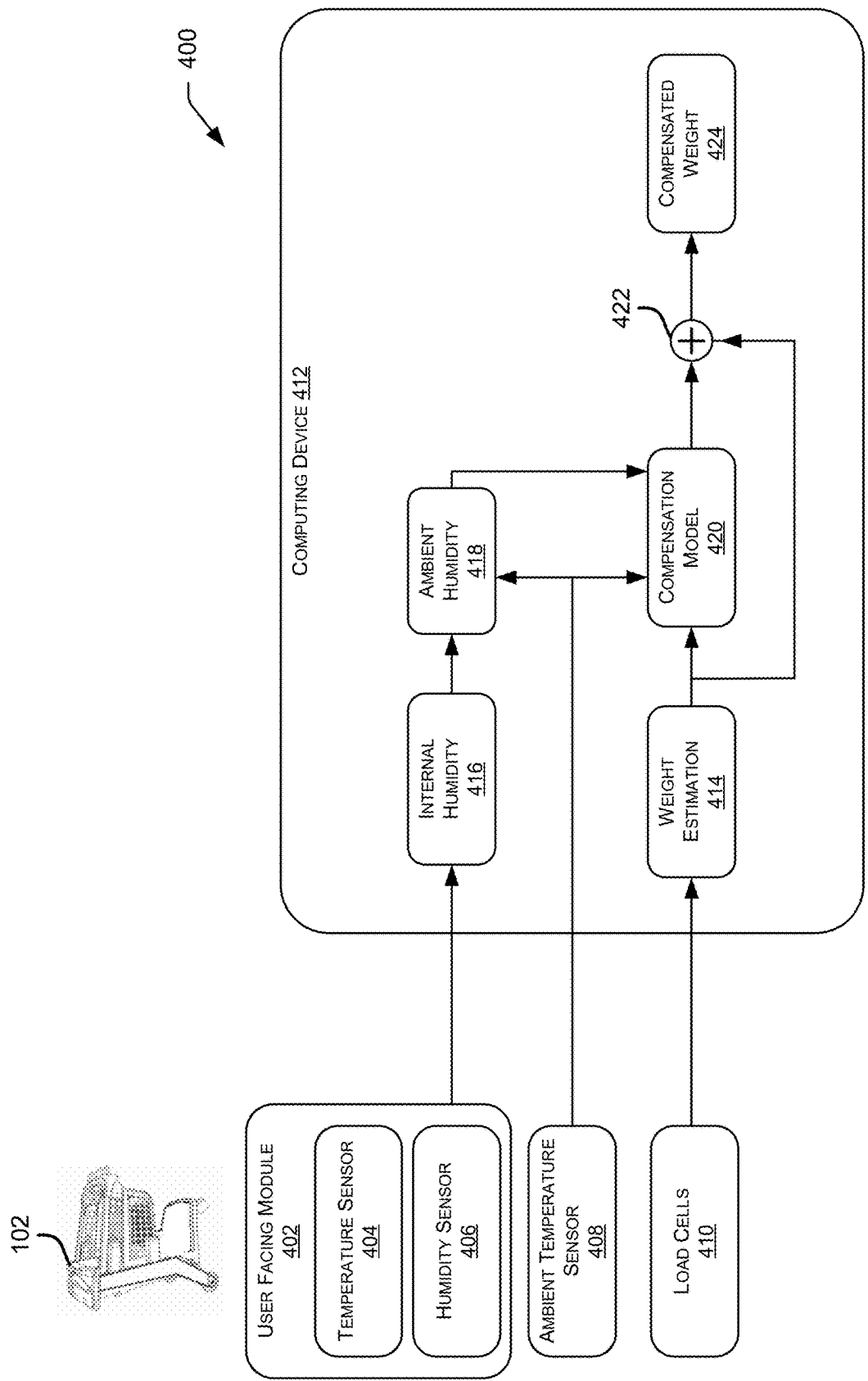
FIG. 4 illustrates an example system for a temperature and/or humidity compensation model on a mobile apparatus, according to at least one example.

FIGS. 2-4 illustrate different systems for the compensation model 112 that may be used to compensate for different types of error-inducing characteristics of the environment where the mobile apparatus 102 operates. FIG. 2 illustrates an example system 200 for a compensation model on a mobile apparatus 102, according to at least one example. The mobile apparatus 102 is shown and may include one or more weight sensors 202 to detect weights for items placed within the basket of the mobile apparatus 102. The weight sensors 202 may include load cells coupled to the basket of the mobile apparatus 102. The mobile apparatus 102 also includes environmental sensors 208 to detect conditions of the environment, mobile apparatus 102, and/or the items within the basket. The environmental sensors 208 may include temperature, humidity, cameras (e.g., IR cameras, visible spectrum cameras), and other sensors that may be used to detect conditions that may impact the efficacy of the load cells of the mobile apparatus 102.

The example system 200 is illustrative of a compensation model 210 that may be implemented to perform one or more different compensations. For example, the compensation model 210 of FIG. 2 may include components and/or factors for compensating temperature and/or humidity as well as item location, as shown and described with respect to FIGS. 3-4. The compensation model 210 may include a machine learning model such as an ordinary least squares regression model. The ordinary least squares regression model or other model or method for choosing unknown parameters in a linear regression model. The ordinary least squares regression model or other machine learning model may be used for identifying the compensations to apply based on the conditions detected by the weight sensors 202 and the environmental sensors 208.

The computing device 204, which may include the computing device 114 and/or an on-board computing device of the mobile apparatus 102, may implement the compensation model 210 to determine a compensated weight 214 for items placed in the basket. The computing device 204 may receive data from the weight sensors 202 and the environmental sensors 208.

The computing device 204 may implement the compensation model 210 as a corrective function to predict scale error as a function of sensor data. This relationship is learned by placing different loads in the basket at varying conditions detected by the weight sensors 202 and the environmental sensors 208. For the different loads, the sensor data and load information may be recorded with the uncompensated weight as determined by the scale of the mobile apparatus 102. Then an error may be estimated based on the known weight of the item placed in the basket. The error (e.g., the difference between the estimated weight and the actual item weight) may be regressed with the sensor data from weight sensors 202 and the environmental sensors 208 to generate the compensation model 210.

In use of the mobile apparatus 102, the weight sensors 202 and the environmental sensors (collectively "sensors"), which include the load cells and other sensors may be used to calculate, by the computing device 204, a weight estimation 206. The information from the sensors, and the weight estimation 206 are fed into the compensation model 210 to compute a correction factor at 212. The correction factor is then subtracted from the weight estimation 206 to give a compensated weight 214. The compensated weight 214 falls within the required conditions for tolerance of sale by weight or other such accuracy requirements.

FIG. 3 illustrates an example system 300 for a localization compensation model on a mobile apparatus, according to at least one example. The mobile apparatus 102 is shown and may include one or more load cells 302 to detect items placed within the basket of the mobile apparatus 102.

The example system 300 is illustrative of a compensation model 310 that may be implemented to perform localization compensation (e.g., to account for eccentric loading of the load cells 302). The compensation model 310 may include a machine learning model such as an ordinary least squares regression model. The ordinary least squares regression model or other model or method for choosing unknown parameters in a linear regression model. The ordinary least squares regression model or other machine learning model may be used for identifying the compensations to apply based on the load detected by the load cells 302.

The computing device 304, which may include the computing device 114 and/or an on-board computing device of the mobile apparatus 102, may implement the compensation model 310 to determine a compensated weight 314 for items placed in the basket regardless of location within the basket.

For load localization compensation using the compensation model 310, compensation of the weight data due to off-center (eccentric) excitation of the load cells connected between the basket and frame of the mobile apparatus 102. One of the requirements for scale certification in the US (NTEP) and EU (OIML) is for the scale to be accurate within prescribed tolerances when measured at each of the corners of the scale platform (e.g., basket). In the instance of the mobile apparatus 102, the scale includes the basket and two or more (e.g., 4) load cells (as shown in FIGS. 5A-5C). Eccentric excitation of the scale causes the load to be distributed non-uniformly across the load cells and may introduce gain error due to shearing and/or bending of the scale platform (basket).

The compensation model 310 may be trained and/or developed to learn empirically the distribution of error in estimating weight at any given (X,Y) location on the scale platform in order to compensate the estimate weight with a corrective factor that brings the mobile apparatus within NTEP/OIML tolerance. The compensation model 310 may use the ordinary least squares regression model trained to predict scale error as a function of pre-existing load and the location of the load placement on the scale.

The computing device 304 receives data from the load cells 302 and decides of the weight estimation 306. The initial weight estimation is not yet compensated based on loading of the scale platform to account for induced errors. The localization 308, receives the data from the load cells and determines the center of mass (e.g., position) of the load placed in the basket. For example, by determining a center of mass before and after the load is placed in the basket. For testing and establishing the compensation model 310, an indication of the load being placed may trigger the determination of the location of the load. In some examples, the change in the load cell data may be the indication of the load.

The weight estimation 306 and the location information from the localizer 308 is fed into the compensation model 310. The compensation model 310 takes the weight estimation 306 and the location data for the load to determine a correction factor at 312. The correction factor is then subtracted from the weight estimation 306 to determine a location independent weight estimate, the compensated weights 314.

In order to learn the relationship for the compensation model 310, the scale may be loaded at pre-defined positions across the bottom of the basket (as illustrated in FIGS. 5A-5C). For each position, varying loads (known and predetermined) may be placed and the uncompensated weight estimated by the scale may be recorded for each location and weight value. An error may be determined based on the known weights (predetermined weight) and the uncompensated estimate. The error may then be used to regress the error in the uncompensated weight estimate and location coordinates of the weight placement.

During inference, the mobile apparatus 102 uses the compensation model 310 to determine the compensated weight 314 for an item placed in the basket. The compensated weight 314 may be used for identifying items placed in the basket based on an accurate measurement of the weight of the item. The compensated weight may also be used for accurately measuring items that are sold by weight. The item, and the corresponding price of the item sold by weight may be added to a virtual cart of a user associated with the mobile apparatus 102.

FIG. 4 illustrates an example system 400 for a temperature and/or humidity compensation model on a mobile apparatus, according to at least one example. The mobile apparatus 102 is illustrated as having a user facing module 402, such as the display 632 and associated components described with respect to FIG. 6. The user facing module 402 may include a temperature sensor 404 and a humidity sensor 406. The temperature sensor 404 and the humidity sensor 406 may be incorporated within the housing of the user facing module 402. The sensors may include sensors already present within the user facing module 402 as components of a computing device on-board the mobile apparatus 102. For example, the humidity sensor 406 may be positioned at or near an exhaust fan of the housing of the user facing module 402. The temperature sensor 404 may similarly measure the temperature in and around the mobile apparatus. In some examples, the mobile apparatus 102 also includes an ambient temperature sensor 408. The ambient temperature sensor 408 may include a temperature sensor coupled to a metal structure, such as the frame, of the mobile apparatus 102. In this manner, the metal frame may serve to provide a reflection of the ambient temperature around the mobile apparatus 102. The mobile apparatus 102 also include load cells 410 coupled between the frame and basket of the mobile apparatus 102 that are configured to provide a weight of the basket and items placed therein.

After the compensation model 420 is trained and/or generated, the compensation model 420 may be used to receive data from the mobile apparatus 102 and produce a compensated weight 422. The compensation model 420 is implemented on a computing device 412 that may be on-board or communicatively coupled (e.g., connected over a network) with the mobile apparatus 102.

The load cells 410 produce a weight estimation 414 for the item placed within the basket of the mobile apparatus 102. The estimate, from the load cells 410 may be adjusted by the compensation model 420 using the humidity and/or temperature data. In some examples, the humidity (e.g., ambient humidity) is calculated using the relative humidity from the humidity sensor 406. For example, the internal humidity 416 of the user facing module 402 may be used to calculate and/or assume the ambient humidity 418 in the environment around the mobile apparatus 102. The internal humidity 416 may be measured and/or detected as relative humidity. The relative humidity 416 may be used to determine the absolute humidity along the with ambient temperature data. Similarly, the ambient temperature may be calculated from the temperature data of the temperature sensor 404.

The ambient humidity 418, ambient temperature data, and weight estimation 414 are fed into the compensation model 420 for adjustment based on the particular environmental conditions. The compensation model 420 takes in the data and estimates a correction factor at 422. The correction is then applied to the weight estimation 414 to produce the compensated weight 424. This correction, and other corrections described herein, may be added, or subtracted from the initial weight estimates. The corrections described herein may also be applied as a gain correction to the weight estimation 414.

FIGS. 5A-5C illustrate example layouts 500, 510, and 520 of a basket 502 of a mobile apparatus for determining a localization compensation model, according to at several examples. The basket 502 is viewed from above, with the representation showing a two-dimensional representation (X,Y) of a surface where items may be placed within the basket 502. The basket 502 is coupled to a frame of the mobile apparatus through load cells 504 such that the load cells can be used to measure the weight of items placed in the basket 502. The example layouts 500, 510, and 520 may illustrate different components or methods for evaluating components of localization (e.g., impact of where weights are placed within the basket 502). In some examples, one or more of the example layouts 500, 510, and 520 may be used for the localization measurements 108 of FIG. 1. In some examples, one or more of the example layouts 500, 510, and 520 may be used, either independently or in conjunction with other layouts to determine correction factors for localization. For example, in a particular instance, the example layout 510 may be used for placing weights of varying values in different quadrants and recording the load cell data to generate an algorithm or machine learning approach that compensates for localization based on the load cell data.

In FIG. 5A, the example layout 500 illustrates a first example for determining a localization compensation model for the mobile apparatus 102. The example layout 500 may be used for evaluating the impacts of localization (e.g., impact of where weights are placed within the basket 502) on the weight determination by the system. The example layout 500 includes indicia 506 indicating locations where items may be placed during generation of the compensation model. The items (of a predetermined weight) may be placed at the locations indicated by the indicia 506 and data from the load cells 504 recorded to determine coefficients and generate the compensation model for localization. By placing the items of known weight at the locations of the indicia 506 and recording the actual weight as well as the weight from the load cells and location of the placed item, the compensation model may be generated that may infer compensation to apply to the uncompensated weight data received from the load cells.

In FIG. 5B, the example layout 510 shows a second example for determining a localization compensation model for the mobile apparatus 102. The example layout 510 shows the basket 502 divided into nine segments by divisions 512. Similar to as described with respect to FIG. 5A, items placed in the different segments of the basket 502 may be mapped with load cell data and actual weights of items with item locations to generate the compensation model capable of being used to infer compensation for any location of item placement within the basket 502. The example layout 510 may be used for placing weights of varying values in different quadrants and recording the load cell data to generate an algorithm or machine learning approach that compensates for localization based on the load cell data.

In FIG. 5C, the example layout 520 shows the basket 502 with a center indicia 522 and line 524 connecting the center indicia 522 to a corner of the basket 502. In some examples, the example playout 520 may be used for determining a threshold distance or location at which a weight may be placed (e.g., a distance from the center and/or towards a corner of the basket 502) before the system will need to apply a compensation to the weight estimate. In the example layout 520, along the line 524, items of known weight may be placed at set distances and/or known locations. The locations 526 may be spaced evenly, for example at two-inch spacing. Similar to as described with respect to FIG. 5A, items placed along the line 524 may be mapped with load cell data and actual weights of items with item locations to generate the compensation model capable of being used to infer compensation for any location of item placement within the basket 502.

Figure 6:
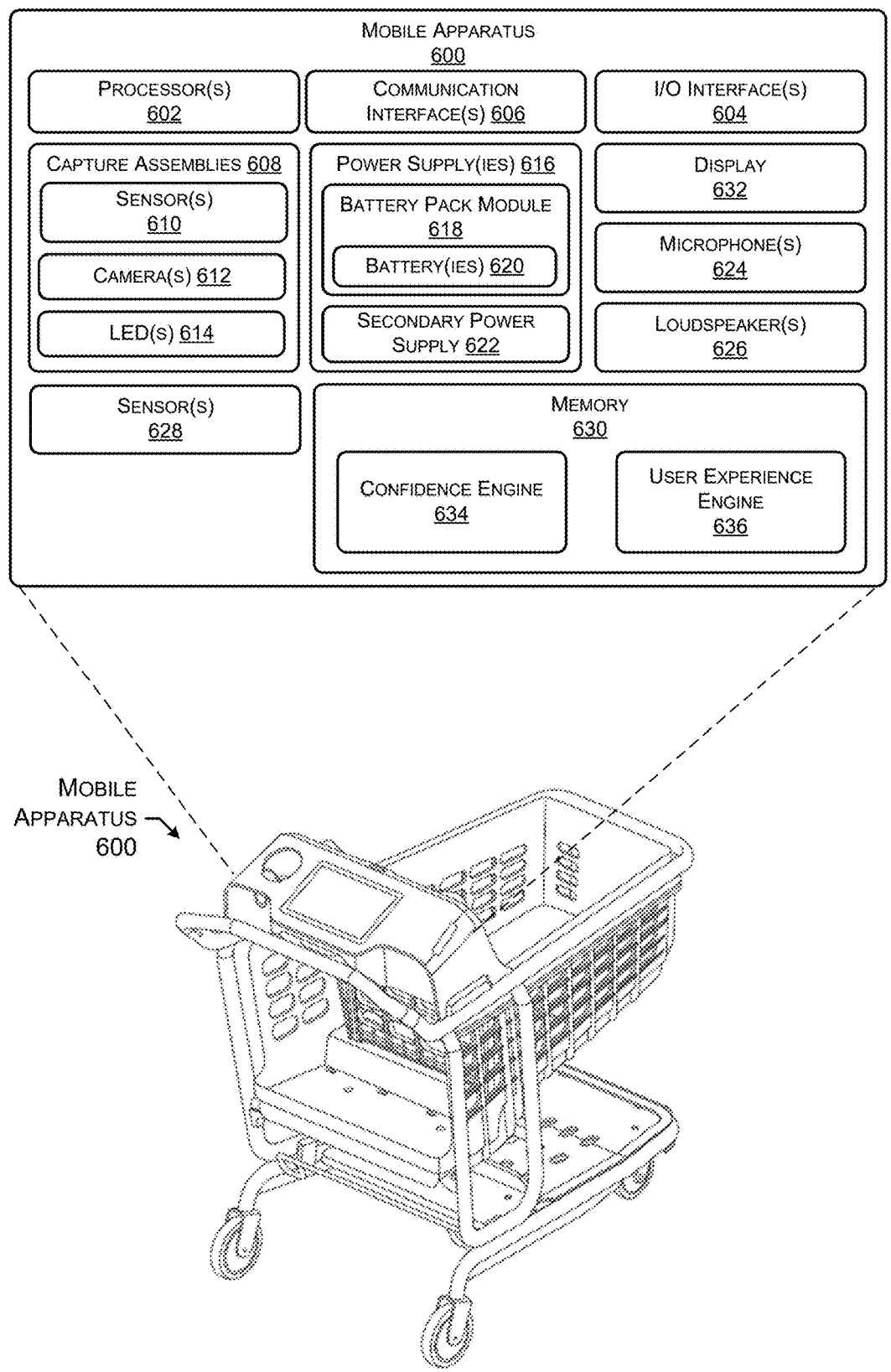
FIG. 6 illustrates an example of components of a user-facing module, according to at least one example.

FIG. 6 illustrates example components of a mobile apparatus 600, which may be an example of the mobile apparatus 102 of FIG. 1, configured to support at least a portion of the functionality of an item management system. The mobile apparatus 600 may include one or more hardware processors 602 (processors) configured to execute one or more stored instructions. The processor(s) 602 may comprise one or more cores. The mobile apparatus 600 may include one or more input/output (I/O) interface(s) 604 to allow the processor(s) 602 or other portions of the mobile apparatus 600 to communicate with other devices. The I/O interface(s) 604 may comprise Inter-Integrated Circuit (I2C), Serial Peripheral Interface bus (SPI), Universal Serial Bus (USB) as promulgated by the USB Implementers Forum, and so forth. The I/O interface(s) 604 may allow the various modules/components to communicate with each other and/or control each other.

The mobile apparatus 600 may also include one or more communication interfaces 606. The communication interface(s) 606 are configured to provide communications between the mobile apparatus 600 and other devices, such as the server(s), sensors, interface devices, routers, and so forth associated with the facility. The communication interface(s) 606 may include devices configured to couple to personal area networks (PANs), wired and wireless local area networks (LANs), wired and wireless wide area networks (WANs), and so forth. For example, the communication interfaces 606 may include devices compatible with Ethernet, Wi-Fi™, and so forth. The mobile apparatus 600 may also include one or more busses or other internal communications hardware or software that allow for the transfer of data between the various modules and components of the mobile apparatus 600.

The mobile apparatus 600 may also include the one or more capture assemblies 608 that each include one or more sensors 610, a camera 612, and one or more LEDs 614. In some examples, the sensor(s) 610 may comprise any type of sensor that is able to detect the presence of nearby objects without the need for physical contact (e.g., ToF sensor(s), PIR sensor(s), capacitive sensor(s), etc.). The cameras 612 in each of the capture assemblies 608 may comprise any type of camera or imaging device configured to generate image data (and/or video data), or information descriptive of a plurality of picture elements or pixels. The LED(s) 614 may be selectively activated to emit light at any wavelength, visible or non-visible to users. In some examples, one or more capture assemblies 608 may additionally, or alternatively, be facing downward into the basket or receptable of the mobile apparatus 600. Additionally, the mobile apparatus 600 may include one or more cameras 612 that are outward facing in that generate image data representing the facility around the mobile apparatus 600.

The mobile apparatus 600 may include one or more power supply(ies) 616 to provide power to the components of the mobile apparatus 600, such as a battery pack module 618 (e.g., the battery), which include one or more batteries 620. The power supply(ies) 616 may also include a secondary (e.g., internal) power supply 622 to allow for hot swapping of battery pack modules 618, such as one or more capacitors, internal batteries, etc.

The mobile apparatus 600 may also include a display 632 configured to display content represented by image data, such as pictures, videos, user interface elements, and/or any other image data. The display 632 may comprise any type of display 632, and may further be a touch screen to receive touch input from a user. The mobile apparatus 600 may also include one or more microphones 624 and one or more loudspeaker(s) 626 to facilitate a dialogue with a user, and/or to receive feedback from the user. The microphone(s) 624 may capture sound representing the user's speech, and the loudspeaker(s) 626 may output machine-generated words to facilitate a dialogue, prompt a user for feedback on an item and/or for other information, and/or output other alerts or notifications.

The mobile apparatus 600 may also include other types of sensor(s) 628. As described herein, these sensor(s) may proximity sensor(s), light sensor(s), and/or the like.

The mobile apparatus 600 may include one or more memories 630 (e.g., in an electronics box module along with the processor(s) 602). The memory 630 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 630 provides storage of computer-readable instructions, data structures, program modules, and other data for the operation of the mobile apparatus 600.

The mobile apparatus 600 may include a confidence engine 634 and a user experience engine 636 as part of the memory 630. The confidence engine 634 may include one or more systems, techniques, algorithms, models, or other such information that may be used to determine a confidence score associated with item interactions detected by the mobile apparatus 600 and/or the facility. The user experience engine 636 may be configured to provide user interactions and experiences such as item research, recommendations, guidance, shopping list information, virtual cart information, and other such information to the user through the display 632. The user experience engine 636 may be configured to interface with one or more digital assistants to provide user interactions and information regarding the facility and/or the items.

The user experience engine 636 may enable a user to interact with a shopping companion, such as a digital assistant or electronic device throughout a shopping experience. The companion may be used to access item information such as price, nutrition facts, size information, reviews, recipes, other items frequently purchased together, measurements, and in-store navigation. In this manner, the carts augment the shopping experience by enabling users to directly access such information through the cart based on their selection (e.g., removal from a shelf) of the item, query provided to a voice digital assistant, and/or browsing on a display of the cart.

The confidence engine 634 may be used to determine a confidence level associated with the virtual cart of the user, such that the cart contents may be known with a sufficiently high degree of confidence such that immediate and real-time and/or near real-time cart content tracking is enabled, in addition to immediate checkout as described herein. The confidence score may be increased through the fusion of sensor data from the facility and the cart to determine a probability (e.g., confidence score) that the user is in possession of the item.

The system (e.g., the servers associated with the facility and/or the mobile apparatus) may then use the probability to determine whether the user was in possession of the item at the time of exiting the facility. In some instances, the system may determine that the user was in possession of the item when the probability satisfies (e.g., is equal to or greater than) a threshold probability (e.g., 98%, 99%, etc.), and determine that the user was not in possession of the item when the probability does not satisfy (e.g., is less than) the threshold probability. For example, and using the example above, the system may determine that the user was in possession of the item when exiting the facility based on the 99.9% probability satisfying a threshold probability of 99%. As will be discussed in more detail below, when the system determines that the user was in possession of the item, the system may store data representing an identifier of the item in association with the account of the user and/or process a transaction for a price of the item.

In some examples, the confidence score and/or probability may be used to direct a user to one or more different exit routes through the facility to complete their shopping experience. In some examples, the confidence score may exceed a first threshold and thereby enable a user to proceed according to an automated checkout system, whereby the user can exit the facility without stopping for a conventional checkout stop. In some examples, the confidence score may be less than the first threshold, in which case the user may be directed to a manual checkout or audit station where the contents of the cart may be reconfirmed. In some examples, the confidence score may be greater than a second threshold, the second threshold being greater than the first threshold. In instances when the confidence score exceeds the second threshold, the system may present a receipt immediately upon determining the user has exited the facility and charge the payment mechanism of the user. In some examples, such as when the confidence score falls between the first and the second threshold, the system may evaluate sensor data and/or event data generated during the shopping trip using one or more systems or algorithms that may process the image data to further increase the confidence score. In such examples, the transaction may not be completed until such additional processing is complete.

In particular, the user experience engine 636 may be used to enable a user with an ability to check prices, monitor a total cost for items in the cart, research products, locate items within the facility, place orders for items (such as items to be prepared e.g., custom weight items for meat products or cooked items), receive notifications, and receive personalized notifications during their shopping experience.

Figure 7:
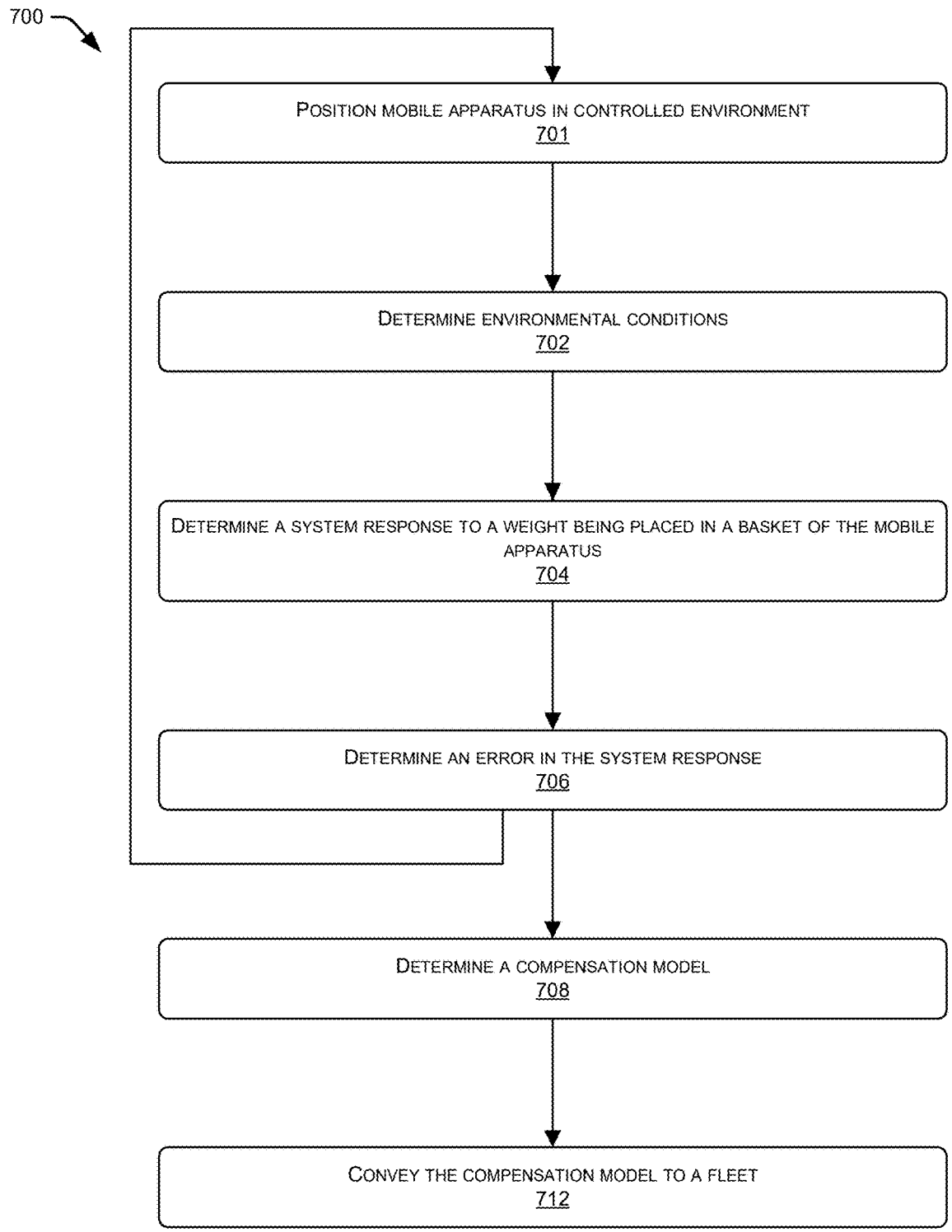
FIG. 7 illustrates a process for determining a compensation model for a fleet of mobile apparatuses, according to at least one example.

FIG. 7 illustrates a process for determining a compensation model for a fleet of mobile apparatuses, according to at least one example. The processes described herein are illustrated as collections of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

At 701, the mobile apparatus 102 is positioned in a controlled environment having a first set of environmental conditions. The environmental conditions may be held constant and/or at a steady state and the mobile apparatus may rest in the controlled environment for a sufficient period of time to normalize to the first set of environmental conditions.

At 702, the process 700 includes determining environmental conditions at and around a mobile apparatus 102. Determining the environmental conditions may include receiving, at a computing device, data from one or more sensors connected to or in communication with the mobile apparatus 102. For example, the sensors may detect temperature, humidity, pressure, and other such data in the environment around the mobile apparatus 102. In developing a compensation model, the environmental conditions may be controlled at particular setpoints, and in some instances the setpoints may be used for the environmental conditions in place of the sensor data. In some examples, for instance when compensating for temperature and/or humidity effects on the load cells, the mobile apparatus may be positioned within a chamber at 701 with a controlled temperature and/or humidity set point that may be changed to perform the process 700 at different set points and generate a compensation model.

At 704, the process 700 includes determining a system response to a weight being placed in a basket of the mobile apparatus. The system response may include estimation of the weight based on load cell data from the mobile apparatus 102. The system response may be determined based on weight data from one or more load cells of a mobile apparatus 102. The weight data may be reflective of the mobile apparatus 102 when the basket is empty or before addition of a known weight into the basket and after the weight is added, thereby measuring the response.

In some examples, the system response may be used to determine when a weight is placed in a basket of the mobile apparatus 102. In some examples, the indication may be a change in the load cell data. The indication of the weight being placed, and therefore the indication to measure the system response, may also be an input from a user confirming placement of the weight in the basket.

At 706, the process 700 includes determining an error in the system response. The error may be based on differences between the known weight of the item (e.g., weight) placed in the basket and the estimated weight from the load cell data, the location as determined versus the known location, or other such differences. The error may be used for generating a compensation model.

The process 700 may include repetition of 701, 702, 704, and 706 with varied environmental conditions and/or placement locations for weights within the basket of the mobile apparatus 102. Therefore, the process 700 may return to 702 with a different set of conditions (e.g., different temperature, humidity, weight location placement, or other such parameters) for determining additional error data from the system response.

At 708, the process 700 includes determining a compensation model for the mobile apparatus. The compensation model may be determined or generated using the data from the weight data, known location, measured temperature and humidity data, and other such data from the environmental conditions. The compensation model may use a limited set of data and then infer between those points to enable the compensation model to determine compensation for load cell data to correct for induced errors in the load cell data, preventing the need to exhaustively test every possible combination, which may be time intensive and nearly impossible as the number of possible factors may increase and rapidly increase the complexity of forming such an exhaustive table. Instead, the compensation model may be used to infer compensation data for accuracy of weight measurement in all conditions. The compensation model 708 may be determined as a result of the error determined at 706. In some examples, the compensation model, as described herein may include a regression model, machine learning model, or other algorithm capable of inferring compensation based on the predicted error based on the environmental and other conditions.

At 712, the process 700 includes conveying the compensation model to a fleet of mobile apparatuses. The process 700 may be performed on one, two, three, or some other subset of the mobile apparatuses and then conveyed to a fleet of mobile apparatuses that share hardware and configuration. The fleet may then use the compensation model for inference to adjust estimated weight data and ensure accuracy.

FIG. 8 illustrates an example environment 800 of a materials handling facility 802 that includes an item-identifying cart 804 to identify items 806 placed in, and removed from, a basket of the cart 804 by an example user 808. In some instances, the cart 804 corresponds to the mobile apparatus 102 described above. In addition to identifying and analyzing image data for determining a location of the cart, the cart 804 may generate first image data for identifying a user and generate second image data depicting the item 806. In addition, the cart may analyze the second image data to identify an item identifier for the item 806, determine the event 810 involving the item (e.g., add to cart, remove from cart, multiple items, quantity of items, etc.) and update a virtual shopping cart associated with the identified user 808 using the item identifier.

As FIG. 8 depicts, the user 808 may have engaged in a shopping session in the materials handling facility 802. For instance, the user 808 may have selected an item 806 from an inventory location 812 (e.g., shelf, aisle, etc.) and placed the item 806 in the cart 804 (e.g., shopping cart). The inventory location 812 may house one or more different types of items 806 and the user 808 may pick (i.e., take, retrieve, etc.) one of these items 806.

As illustrated, the materials handling facility 802 (or "facility") may have one or more entry locations 814, such as lanes. The entry location 814 may be defined by a gate in some examples and may include a movable barrier to control movement of users 808. For example, the gate may include computer-controlled panels that may be closed to impede passage of the users 808 or opened to permit passage of the user 808. Upon entering a facility 802, a user 808 may desire to utilize a cart 804 for their shopping session to transport items 806 around the facility 802 during their shopping session. In such examples, the user 808 may approach a cart corral 816, or other locations, at which carts 804 are stored. In some examples, the cart corral 816 may comprise a structure, such as an aisle, for storing nested carts 818.

Generally, two or more of the carts 804 may be configured to nest or otherwise functionality join with one another, so that the carts 804 may be easily stored in a cart corral 816, and/or transported in bulk. In some examples, the cart corral 816 may provide additional functionality beyond storage. For instance, the cart corral 816 may facilitate charging of the nested carts 818 that are in the cart corral 816. For instance, the cart corral 816 may have various electrical contacts extending along the length of a horizontal and/or vertical member of the corral 816 that, when placed in electrical contact with an electrical contact of the nested carts 818, charge one or more batteries of the nested carts 818. In other examples, power cords may extend from the cart corral 816 that may be plugged into the nested carts 818 to recharge batteries of the nested carts 818 while not in use.

In some instances, as described above, each of the nested carts 818 may reside in a low-power (e.g., deep-sleep) state when in the cart corral 816. For instance, proximity sensors of the cart may detect an object (e.g., another cart) very near and, in response, may cause the respective cart to enter the low-power state. In addition, or in the alternative, each cart may include a mechanical switch that may be actuated when placed into the cart corral 816, resulting in the cart entering the low-power state. In still other instances, when the cart corral 816 includes the electrical contacts to contact with corresponding contacts of the nested carts 818, each cart may use this signal to cause the cart to enter the low-power state. Of course, while a few examples are provided, the carts may enter the low-power state in any number of ways when nested with other carts in the corral 816.

To utilize a cart 804, a user 808 may approach an unused cart that is not currently engaged in a shopping session (e.g., a nested cart 818), and interact with the unused cart 804 to identify themselves to the cart 804 and begin a shopping session. For instance, the carts 804 may include a first imaging device 834(1) (e.g., an image sensor such as a camera, photodetector, or other sensing apparatus designed to read a one or two-dimensional barcode) such that when a user 808 presents a user device, or portion thereof, such as the display 836, to the imaging device 834(1), the cart 804 may identify the user and corresponding user account for a shopping session. Other types of interaction may be performed by a user 808 to identify themselves to a cart 804 (e.g., uttering a name or other keyword to identify the user 808, presenting the user's face for facial recognition, typing in a password or other user information into a display 836 of the cart 804, and/or any other type of user identification technique).

Further, in some instances the cart 804 may transition from a low-power state to a higher-power state in response to the user approaching the cart 804 and/or removing the cart 804 from the corral 816. For instance, the imaging devices 834 and/or the proximity sensors may identify the user approaching (e.g., entering within the threshold distance of the cart 804) and, in response, may cause the cart to enter the higher-power state by, for example, powering on and/or up one or more components that were previously powered off and/or down. In another example, removing the cart 804 from the corral 816 may cause the mechanical switch to trip or may cause the electrical contacts of the corral 816 to become uncoupled from the contacts of the cart 804, resulting in the cart entering the higher-power state. Again, while a few examples are provided, it is to be appreciated that the cart may transition from a low-power state to a higher-power state in response to being removed from the corral 816 and/or in response to a user approaching the cart 804 in any number of other ways.

Once a user has identified themselves to the cart 804, the item-identifying functionality of the cart 804 may be activated such that subsequent items 806 placed in the cart 804 will be identified by the cart 804 and added to a virtual shopping cart for the user 808. As illustrated, a user 808 may move the cart 804 around the facility 802 to one or more inventory locations 812. The user 808 may retrieve items from the inventory location 812 and place the items 806 in the cart 804. Additionally, the user 808 may retrieve items 806 from the cart 804 and put the items 806 back in an inventory location 812, such as when the user 808 changes their mind regarding their desire to purchase or otherwise acquire the item 806. The cart 804 may include various components for identifying item identifiers corresponding to the items 806 placed in the cart and maintaining a virtual shopping cart for the shopping session of the user 808.

Once the user 808 has finished their shopping session, the user 808 may end the shopping session in various ways. For instance, the user 808 may return the cart 804 to the cart corral 816, provide input to the cart 804 indicating an end of the shopping session (e.g., utterance, utilize a user interface element on a touch display, etc.), or simply remove item bags or other item carriers from the cart 804 and leave the facility 802. After the user 808 has ended their shopping session, the list of item identifiers in the virtual shopping cart may be uploaded to one or more remote servers 820, over one or more networks 822, that manage user accounts for users 808 of the facility 802. The server(s) 820 may charge the appropriate user account for the listing of the items in the virtual shopping cart that the user took from the facility 802. For instance, the server(s) 820 may be configured to determine or generate information indicative of a cost of the items 806 picked by the user 808. Additionally, the server(s) 820 may store payment information (e.g., credit card information, bank account information, etc.) for each user account. In this way, when the user 808 finished their shopping session and the cart 804 sends the listing of item identifiers in the virtual shopping cart over the network(s) 822 to the server(s) 820, the server(s) 820 may be configured to determine a cost or price for all of the listed item identifiers, and charge the user via their payment information for the items 806 selected during their shopping session. In this way, the user 808 need not go through steps of a traditional check-out experience (e.g., waiting in line for a cashier, scanning items with the cashier, paying for items at the cashier, etc.).

The network(s) 822 may include private networks such as an institutional or personal intranet, public networks such as the Internet, or a combination thereof. The network(s) 822 may utilize wired technologies (e.g., wires, fiber optic cable, and so forth), wireless technologies (e.g., radio frequency, infrared, acoustic, optical, and so forth), or other connection technologies. The network(s) 822 is representative of any type of communication network, including one or more of data networks or voice networks. The network(s) 822 may be implemented using wired infrastructure (e.g., copper cable, fiber optic cable, and so forth), a wireless infrastructure (e.g., cellular, microwave, satellite, etc.), or other connection technologies.

The cart 804 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 822 according to the type of protocol or standard being used. As noted above, in some examples, the servers 820 may perform some or all of the operations described below as being performed by the cart 804. While the servers 820 are illustrated as being in a location outside of the facility 802, in other implementations, at least a portion of the servers 820 may be located at the facility 802.

As illustrated, the cart 804 may generally include or be formed of a frame 824, a basket 826, a first handle 828(1) for pushing the cart 804, a second handle 828(2) for pulling the cart, a wheel frame 830-, and one or more-wheel castors 832 to enable movement of the cart 804 on a surface. The frame 824, the basket 826, the handles 828, and the wheel frame 830 may be formed from any suitable materials such as plastics, wood, metals, composites, or any other combinations of materials. Moreover, frame 824, the basket 826, the handle 828, and the wheel frame 830 may take any form.

The basket 826 may generally be part of the frame 824 and/or supported by the frame 824 (e.g., be welded, fused, adhered, bolted, screwed, molded, or otherwise joined to the frame 824). In some examples, the basket 826 may comprise a grid or lattice-like structure (e.g., a honeycombed arrangement or framework) having one or more bars or members that are welded, fused, adhered, bolted, screwed, molded, stitched, or otherwise joined in a substantially perpendicular alignment with respect to one another. The basket 826 may generally be any shape that defines an interior cavity, or receptacle, for receiving items 806 that are placed in the cart 804. The basket 826 may be connected to the frame through one or more load cells 842 such that the load cells can detect a weight for items placed in the basket 826. The basket 826 may comprise a bottom, multiple sides protruding from the bottom, and a top. As illustrated, the bottom basket 826 may be in the shape of a quadrilateral such that there are four sides protruding from the bottom of the basket 826. Similarly, the top of the basket 826 may be defined according to the quadrilateral shape and have a perimeter with four corners. The perimeter of the top of the basket 826 may define an opening to the interior cavity (or receptacle) of the basket 826 to receive items placed inside the basket 826. In various examples, the perimeter of the top of the basket may be disposed in a substantially horizontal plane (e.g., a plane substantially along the x-axis as illustrated), and the frame 824 may include at least one vertical member that extends downward from the basket 826 to the wheel frame 830 along a substantially vertical plane (e.g., a plane substantially along the y-axis as illustrated).

The wheel frame 830 may support one or more-wheel castors 832 to enable movement of the cart 804 along a surface. The wheel casters 832 include one or more wheels, axles, forks, joints, or other components which enable the cart 804 to travel on various surfaces. For example, in some implementations each of the wheel casters 832 may include a single wheel provided on an axle within a fork, or two or more wheels provided on such an axle. In some other implementations, the wheel casters 832 may include two or more axles. Alternatively, in still other implementations, a single caster may be provided in lieu of the multiple wheel casters 832 shown in FIG. 8. In accordance with the present disclosure, the wheel casters 832 may operate in any manner, such as being configured to pivot or swivel, and thus automatically adjust or align with a direction of travel. In some examples, the cart 804 may be equipped with other apparatuses for enabling the cart 804 to travel on solid surfaces, including one or more wheeled components other than casters, including but not limited to omnidirectional wheels, spherical wheels, or other like apparatuses. Additionally, in some other implementations, the cart 804 may include two or more skis or other runners for traveling on smooth surfaces. In still other implementations, the cart 804 may be levitated, e.g., by magnetic levitation through the use of one or more linear induction motors. Moreover, the cart 804 may be propelled or pushed by humans or autonomous mobile robots or, alternatively, by one or more motors (e.g., electric-powered, or gasoline-powered).

As illustrated, the cart 804 may include a first imaging device 834(1), for identifying a user operating the cart as described above, and additional, second imaging devices 834(2), 834(3), 834(4) . . . , 834(N) that include components for use in identifying items placed in the basket 826 and removed from the basket 826. The imaging device 834(1) may, in some instances, be positioned in a manner such that an FOV of the imaging device 834(1) is away from the basket 826 and substantially towards the first handle 828(1) where a user may typically operate the cart 804. The imaging devices 834(2)-(N) may be positioned at any location on the cart 804 (e.g., in the basket 826, on the basket 826, mounted to the frame 824, mounted to the basket 826, and/or any other location), oriented to have respective FOVs for identifying events that occur within and proximate to the basket 826. In some examples, the cart 804 may include at least four of the second imaging devices 834(1), 834(2), 834(3), and 834(N) that are disposed or coupled proximate to four corners of the top of the basket 826. In some examples, one or all of the components of the second imaging devices may be disposed internal to the form factor of the basket 826 and/or frame 824, at least partially internal to the form factor of the basket 826 and/or frame 824, and/or entirely external to the form factor of the basket 826 and/or frame 824 (e.g., mounted to the cart 804). However, in the illustrated example, the second imaging devices may be disposed at locations proximate to the four corners of the top or perimeter of the basket 826/frame 824. In some instances, the less that the second imaging devices protrude from the form factor of the cart 804, the more efficiently the carts 804 may be nested with respect to each other.

As described in further detail below with respect to FIG. 10, the cart 804 may further include one or more one light sources (e.g., LED) for emitting light at or prior to the time of the second imaging devices generating the second image data. The cart 804 may further include, in some instances, one or more proximity sensors (e.g., ToF sensor, PIR sensor, etc.). In some examples the proximity sensors may be activated to detect the proximity of users, objects above the top of the basket 826, and/or other objects. The proximity sensors may be configured to generate sensor data that indicates distances between objects above the top of the basket 826 of the cart 804 and the second imaging devices.

The cart 804 may include components configured to analyze the sensor data and determine that an item 806 is within some threshold distance from the top of the basket 826 and/or within the basket 826. Upon detecting an object within the threshold proximity of the basket 826 using the proximity sensor, one or more components of the cart 804 may cause the light sources (LEDs) to emit light and the second imaging devices to generate image data. In some examples, the FOVs of the second imaging devices 834(2)-(N) may each at least partially overlap at a location above the top of the basket 826 corresponding to a centroid of the quadrilateral defining the top of the basket 826. The light sources may illuminate the basket 826 and/or the area above the top of the basket 826 to illuminate items 806 being placed in the cart 804, or removed from the cart 804, to act as a "flash" for the cameras that are generating image data. The second imaging devices may generate image data for a predefined period of time and/or until the proximity sensors (or the image data itself) indicates that there is no longer an object within the threshold distance from the cart 804 or top of the cart 804.

After generating the image data, one or more components of the cart 804 may process the image data to determine an item identifier for the item(s) 806 represented in the image data, and an event 810 for the image data (e.g., addition of an item 806 to the cart, removal of an item 806 from the cart). As described in more detail below, the cart 804 may include component(s) to determine an item 806 identifier for the item 806 (e.g., name of the item 806, SKU number for the item 806, etc.), and determine if the item 806 is being taken from the cart 804, or added to the cart 804, based on the motion of the item 806 and the result of the movement around the cart 804 once movement is no longer detected and represented by the image data. The components of the cart 804 may then update a virtual shopping cart associated with the cart 804 that indicates a virtual listing of items 806 taken by the user 808 from the facility based on the determined event 810. In some examples, the image data may be transmitted to the server(s) 820 over the network(s) 822 where the processing may be performed.

In various examples, the cart 804 may include a display 836 to present various information in user interface(s) for the user 808 to consume. In some examples, the display 836 may comprise a touch screen to receive input from the user 808 (e.g., a selection of an item identifier to disambiguate amongst potential item identifiers). In some instances, the display 836 may present customized information to the user 808 upon identifying the user 808, such as a shopping list of the user or the like.

The cart 804 may further include a battery pack module 838 that houses one or more batteries to power the components of the cart 804. The battery pack module 838 may include rechargeable batteries. In some examples, the battery pack module 838 may be detachably coupled to the wheel frame 830 and/or the frame 824 of the cart 804 such that the battery pack module 838 may be removed and taken to a charging station. In various examples, the battery pack module 838 may include rechargeable batteries that may be charged when the cart 804 is placed in a cart corral 816 (e.g., through electrical contacts, power cords, etc.). In various examples, the frame 824 and/or basket 826 may have one or more channels (e.g., grooves, holes, paths, tunnels, etc.) through which power cables/cords may pass. In this way, power cables may be run at least partially through the channels in the frame 824 and/or basket 826 inconspicuously to provide power to the various components of the cart 804.

In some instances, the cart 804 may further include one or more lighting element(s) 840 disposed on the frame 824 and/or basket 826 of the cart 804. The user 808 may, in some instances, operate a controller to turn on (and off) the lighting element(s) 840 to cause the lighting element(s) to emit light. Further, in some instances the controller may enable the lighting element(s) 840 to transition between multiple light states, such as different colors, flashing effects, and/or the like. The controller operable by the user 808 may comprise functionality accessible to the user 808 via the display (e.g., one or more soft buttons for turning on and/or off the light), a physical toggle switch on the frame 824 of the cart 804, and/or the light. Further, the lighting element(s) 840 may be used to signal a predefined state of the cart 804 and/or the user 808. For example, the user 808 may turn on the lighting element(s) 840 to indicate that he or she requests assistance from an associate of the facility 802, or for any other reason. In some instances, in response to the user 808 operating a controller to request assistance, the cart 804 may perform one or more actions in addition to turning on the lighting element(s) 840. For example, the display may present content responding to this request, such as an offer to connect the user 808 with an associate of the store (e.g., in person, via I/O devices of the cart, etc.). For example, in response to requesting assistance, the cart 804 may facilitate an audio-only or an audio/video call between the user 808 and an associate of the facility using one or more I/O devices on the cart, such as the display, one or more speakers, one or more microphones, one or more cameras pointed toward the user 808 and/or the like.

In still other instances, associates of the facility may, remotely or otherwise, operate the lighting element(s) 840 to change states (e.g., turn on or off) and/or the cart 804 may include components to automatically change a state of the lighting element(s) 840. For example, upon the card identifying that an item of a predefined class of items has entered the basket, the cart 804 may cause the lighting element(s) 840 to change state (e.g., from an off state to an on state) to indicate that an additional checkout workflow may now be required. For example, if the user 808 places an item into the basket 826 that requires the purchasing user to be of a certain age (e.g., alcohol) or to have a certain prescription (e.g., medicine), the cart 804 may illuminate the lighting element(s). In some instances, the cart 804 may include a lighting element on a right side of the frame, a lighting element on a left side of the frame, and/or one or more other lighting elements in other locations on the cart 804.

Figure 9:
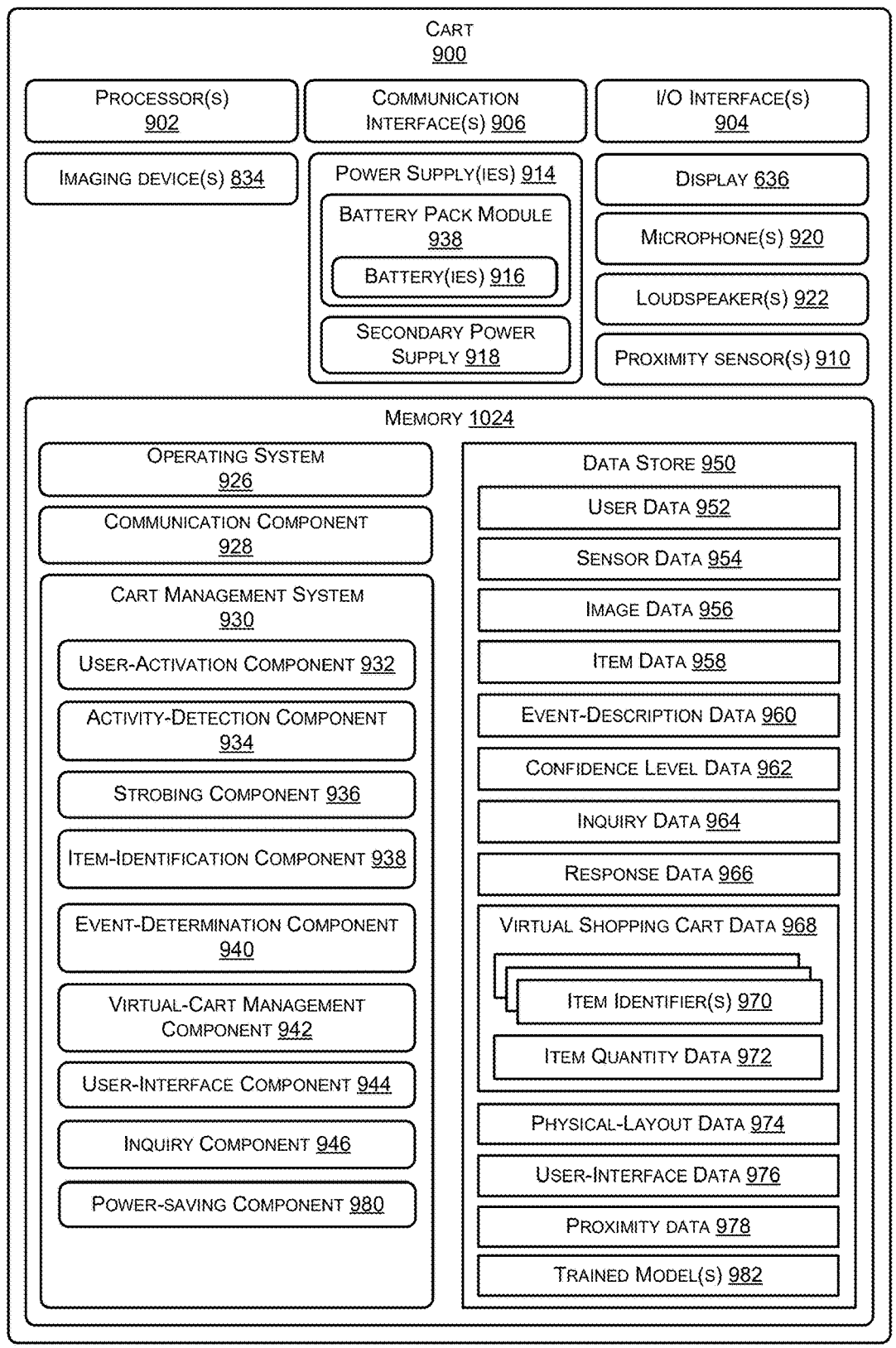
FIG. 9 illustrates example components of a cart configured to support at least a portion of the functionality of a cart management system.

FIG. 9 illustrates example components of a cart 900 configured to support at least a portion of the functionality of a cart management system. In some instances, the cart 900 may correspond to and/or include some or all of the functionality of the carts described above.

The cart 900 may include one or more processors 902 (processors) configured to execute one or more stored instructions. The processors 902 may comprise one or more cores. The cart 900 may include one or more input/output (I/O) interface(s) 904 to allow the processor 902 or other portions of the cart 900 to communicate with other devices. The I/O interfaces 904 may comprise Inter-Integrated Circuit (I2C), Serial Peripheral Interface bus (SPI), Universal Serial Bus (USB) as promulgated by the USB Implementers Forum, and so forth. The I/O interfaces 904 may allow the various modules/components to communicate with each other and/or control each other.

The cart 900 may also include one or more communication interfaces 906. The communication interfaces 906 are configured to provide communications between the cart 900 and other devices, such as the server(s), sensors, interface devices, routers, and so forth. The communication interfaces 906 may include devices configured to couple to personal area networks (PANs), wired and wireless local area networks (LANs), wired and wireless wide area networks (WANs), and so forth. For example, the communication interfaces 906 may include devices compatible with Ethernet, Wi-Fi™, and so forth. The cart 900 may also include one or more busses or other internal communications hardware or software that allow for the transfer of data between the various modules and components of the cart 900.

The cart 900 may also include the one or more sensors 986, such as the first imaging device for identifying a user operating the cart and one or more second imaging devices for identifying items placed into and removed from a basket of the cart. The cart 900 may further include the light sources, the lighting elements, and weight sensors described above.

In some instances, the cart 900 further includes one or more proximity sensors 910. The proximity sensors 910 may comprise any type of sensor that is able to detect the presence of nearby objects without the need for physical contact (e.g., ToF sensors, PIR sensors, infrared sensors, capacitive sensors, ultrasonic sensors, etc.). As described above, each proximity sensor may be configured to output an indication when the respective proximity sensor detects an object within a threshold distance of the sensor. Further, the configured threshold distances may vary from sensor to sensor in order to collectively create a virtual perimeter. Further, in some instances a single proximity sensor may be configured with multiple threshold distances. For instance, in the example of a proximity sensor having 104 diodes, the senor may be effectively split into quadrants of sixteen sensors such that each quadrant is configured to output an indication when an object is detected at a threshold distance that is potentially unique to the other three quadrants. For instance, a distance of the closest object of each diode of the sixteen diodes in a particular quadrant may be averaged and this average distance may be compared to a threshold to determine whether to output an indication that an object has been detected.

The imaging devices, meanwhile, may comprise any type of camera or imaging device configured to generate image data (and/or video data) or information descriptive of a plurality of picture elements or pixels. Additionally, in some instances the cart 900 may include one or more imaging devices that are outward-facing and that generate image data representing the facility around the cart 900.

The cart 900 may include one or more power supply(ies) 914 to provide power to the components of the cart 900, such as the battery pack module. The power supply(ies) 914 may also include a secondary (e.g., internal) power supply 918 to allow for hot swapping of battery pack modules, such as one or more capacitors, internal batteries, etc.

The cart 900 may also include a display 936 configured to display image data, such as pictures, videos, user interface elements, and/or any other image data. The display 936 may comprise any type of display 936, and may further be a touch screen to receive touch input from a user. The cart 900 may also include one or more microphones 920 and one or more loudspeakers 922 to facilitate a dialogue with a user 908, and/or to receive feedback from the user 908. The microphones 920 may capture sound representing the user's speech, and the loudspeaker(s) 922 may output machine-generated words to facilitate a dialogue, prompt a user 908 for feedback on an item and/or for other information, and/or output other alerts or notifications.

The cart 900 may include one or more memories 924. The memory 924 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 924 provides storage of computer-readable instructions, data structures, program modules, and other data for the operation of the cart 900. A few example functional modules are shown stored in the memory 924, although the same functionality may alternatively be implemented in hardware, firmware, or as a system on a chip (SOC).

The memory 924 may include at least one operating system (OS) component 926. The OS component 926 is configured to manage hardware resource devices such as the I/O interfaces 904, the communication interfaces 906, and provide various services to applications or components executing on the processors 902. The OS component 926 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 924. These components may be executed as foreground applications, background tasks, daemons, and so forth. A communication component 928 may be configured to establish communications with one or more of the sensors, one or more of the servers, or other devices. The communications may be authenticated, encrypted, and so forth.

The memory 924 may further store a cart management system 930. The cart management system 930 is configured to provide the item-identifying functions (and other functions) provided by the cart 900 as described herein. For example, the cart management system 930 may be configured to identify a user operating a cart, identify items placed into the cart, and maintain a virtual shopping cart for a user 908 of the cart 900. While these components are described as operating on the cart 900, in some instances some or all of these components reside additionally or alternatively on the servers or elsewhere.

The cart management system 930 may include a user-activation component 932 that performs operations for activating a shopping session using a cart 900 on behalf of a user 908. For instance, a user 908 may have previously registered for a user account with an operator of the facility to utilize various automated management services provided by an operator of the facility. The user 908 may have registered for a user account, such as by providing user data 952, to automate payments made for items taken by the user and included a payment means (e.g., credit card, bank account number, etc.), and may have also provided an identification means in the user data 952 to the user-activation component 932 such that the cart 900 can recognize the user 908. For instance, the user 908 may have registered to identify themselves to the cart 900 using any identification technique by the user-activation component 932, such as by providing user data 952 by presenting an identification means to the first imaging device (e.g., presenting a driver's license, presenting a facility-issued card, presenting a user identifier via a mobile phone, etc.), speaking a predefined utterance that is captured by the microphones 920 (e.g., a name of the user, a predefined keyword, etc.), and/or looking into a camera for facial recognition. Once a user 908 has identified themselves to using the user-activation component 932, the user-activation component 932 may open a shopping session where the cart 900 identifies and track items retrieved by the user 908 and placed in the cart 900.

The cart management system 930 may additionally include an activity-detection component 934 configured to detect items (or objects) within a particular proximity to the cart. For example, one or more proximity sensor(s) 910 may generate sensor data 954 that indicates a distance between the proximity sensor(s) 910 and any objects located in the FOV of the proximity sensor(s). The activity-detection component 934 may analyze the sensor data 954 and determine if an object is within a threshold distance indicating that the object is near the cart 900 and/or within or near the perimeter of the top of the basket of the cart 900 (e.g., one foot from the proximity sensor(s), two feet from the proximity sensor(s), etc.). In this way, the proximity sensor(s) may generate sensor data 954 that indicates whether or not an item is being moved in or out of the basket of the cart 900. However, in some examples, rather than using sensor data 954 generated by a proximity sensor(s), the activity-detection component 934 may utilize image data 956 generated by the imaging devices to determine if an object is within a threshold distance from the cart 900.

The cart management system 930 may further include a strobing component configured to cause the light sources and/or shutters of the imaging devices to strobe according to different frequencies. As noted above, the light sources may emit light in any light spectrum (e.g., infrared, near infrared, visible, etc.). However, some items may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the light sources to emit light in the visible spectrum. When generating image data 956 using the imaging devices, motion blur may appear when capturing fact moving objects. However, the motion blur may be reduced or eliminated by exposing the imaging device's imager for a short (e.g., sub-millisecond) durations. Accordingly, the strobing component may strobe the opening and closing of shutters of the imaging devices to limit the sensor exposure duration. Additionally, the strobing component may cause the LEDs to emit/strobe light at a particular frequency. In some instances, the strobing component may cause the LEDs to strobe at a first rate (e.g., 7200 hertz) prior to detecting predefined activity, such as a user placing an item into or removing an item from a cart, while causing the LEDs to strobe at a second, different rate (e.g., 90 hertz) upon identifying the predefined activity. Further, the LEDs may emit light in the visible range in some instances, and in the non-visible range in other instances. In some examples, the LEDs may comprise RGB LEDs that may be mixed according to different respective levels to tune a resulting color of the LEDs.

The cart management system 930 may also include an item-identification component 938 configured to analyze image data 956 to identify an item represented in the image data 956. The image data 956 may comprise information descriptive of a plurality of picture elements, or pixels, for one or more image frames (e.g., a still picture, multiple picture frames, video frames, etc.). The item-identification component 938 may analyze the image data 956 using various image processing techniques, or computer vision techniques. For instance, the item-identification component 938 may extract a representation of an item depicted in the image data 956 generated by at least one imaging device. The representation may include identifying text printed on the item, colors or color schemes printed in the item, determining 2-D and/or 3D shapes of the items, and/or other techniques for extract a representation of the item. In some instances, the representation of the item depicted in the image data 956 may comprise a numeric representation, such as a feature vector or a set of feature vectors.

In some examples, a data store 950 stored in the memory 924 may include item data 958, which may include representations of the items offered for acquisition at the facility. The item-identification component 938 may compare the extracted represented of the item with the "gallery" or stored representations of the known items in the item data 958. In some instance, the item representation may include an indication of a barcode or SKU data for the item as recognized in, or extracted from, the image data 956. The item-identification component 938 may determine confidence level data 962 based on the comparisons with item representation in the item data 958. The item-identification component 938 may determine, and assign, confidence levels indicating how likely it is that the item represented in the image data 956 corresponds to an item from the item gallery in the item data 958. Based on the confidence level data 962, the item-identification component 938 may determine an item identifier 970 for the item in the image data 956 (or multiple item identifiers 970) that corresponds to an item in the item data 958 to which the item corresponds.

In some examples, the data store 950 may include physical-layout data 974 that is used by the item-identification component 938 to determine the item. The physical-layout data 974 may include or provide a mapping of physical locations within the physical layout of devices and objects such that the location of the cart 900 may be utilized to determine an item stored nearby. The physical-layout data 974 may indicate the coordinates within the facility of an inventory location 912, items stored at that inventory location 912, and so forth. In examples where the cart 900 has location determining sensors (e.g., GPS, RFID, proximity, etc.), the location sensor data may be used to determine where in the store the user 908 is. In such examples, the item-identification component 938 may access the physical-layout data 974 to determine if a location associated with the event is associated with items, and confidence levels for the corresponding representations of items in the item data 958. Continuing the example above, given the location within the facility of the event and image camera data, the physical-layout data 974 may determine the items that may have been represented in generated images of the event.

The cart management system 930 may further include an event-determination component 940 to determine event-description data 960 for the item in the image data 956. The event-determination component 940 may determine if the user 908 is adding an item to the cart 900, removing the item from the cart 900, etc., based on movement of the item and/or whether the item is shown in the image data 956. For instance, if the item is shown as being moved downward towards the interior of the cart 900, and the user's hand then leaves the basket without the item, it can be determined that the user 908 added the item to the cart 900. Similarly, if the user's hand moves into the cart without an item and is depicted in the image data 956 taking an item from the cart, the event-determination component 940 may determine that the user 908 removed an item from the cart 900.

The cart management system 930 may also include a virtual-cart management component 942 configured to manage virtual shopping cart data 968 for the cart 900. For instance, the virtual-cart management component 942 may utilize the item data 958, event-description data 960, and confidence level data 962 to add item identifier(s) 970 to the virtual shopping cart data 968 for items that were added to the cart 900, remove item identifier(s) 970 from the virtual shopping cart data 968 for items that were removed from the cart 900, and track item quantity data 972 indicating quantities of particular items in the cart 900.

The cart management system 930 may further include a user-interface component 944 configured to present user interfaces on the display 936 based on user-interface data 976. The user interfaces 976 may include one or more fields to present data, and/or receive touch input (or other input via a keyboard, mouse, etc.) from a user 908. For instance, if the item-identification component 938 is unable to determine an item identifier 970 for an item shown in the image data 956, the user-interface component 944 may receive inquiry data 964 generated by an inquiry component 964 to prompt a user 908 for feedback to help identify the item, and/or other information (e.g., if multiple items were placed in the cart 900). The inquiry component 946 may be configured to generate inquiry data 964 based on the information needed to identify the item. For instance, the inquiry data 964 may include a prompt to request particular feedback from the user 908, such as to provide input (e.g., touch input, vocal/utterance input, etc.) to identify the item, input to indicate how many items were added to the cart, input to indicate whether an item was removed or added, etc. In some examples, the user-interface component 944 may present one or more images depicting items from the item data 958 that have the highest confidence levels as corresponding to the item in the image data 956, but confidence levels that are not high enough to make a final decision as to the item. For instance, the user-interface component 944 may present pictures of two different items that have high confidence levels 962 and request that the user 908 select or indicate the appropriate item. Additionally, or alternatively, the user-interface component 944 may present user-interface data 976 that prompts the user for feedback regarding whether or not the item was added to, or removed from the cart 900. Responses to the inquiry data 964 may be stored as response data 966.

In some examples, the cart management system 930 may further a power-saving component 980 configured to selectively power off or down one or more components of the cart 900 when the cart 900 determines that no users are within a threshold distance of the cart 900.

For example, the power-saving component 980 may be configured to determine when a user is not within a threshold distance and, in response, may instruct one or more components of the cart 900 to power off or otherwise lessen the power the components consume from the batter(ies) 916. For example, the power-saving component may instruct the item-identification component 938 and/or the event-determination component 940 to stop performing image-processing on the image data 956 generated by the imaging devices or may instruct these components to perform the image-processing at a lesser frame rate. Additionally, or alternatively, the power-saving component 980 may instruct the user-activation component 932 or the activity-detection component 934 to refrain from performing image-processing on the image data 956 or lessen the frame rate at which these components perform the image-processing. In addition, or in the alternative, the power-saving component 980 may instruct any of the other components of the cart management system 930 to power off or down in order to consume less power in response to determining that a user is not within the threshold distance of the cart 900, and/or may instruct any other software and/or firmware components of the cart 900 to power off or down in response.

In addition, or in the alternative, the power-saving component 980 may instruct one or more hardware components of the cart 900 to power off or down in response to determining that a user is not within the threshold distance of the cart 900. For instance, the power-saving component 980 may instruct the imaging devices to power off or lessen a frame rate at which the imaging components generate the image data. Additionally, or alternatively, the power-saving component 980 may instruct the display 936 to power off (or dim its brightness) and/or may instruct the light sources, lighting elements, weight sensors (and/or weight-sensing firmware/software), the communication interfaces 906, I/O interfaces 904, the microphones 920, the loudspeakers 922, and/or any other hardware component of the cart 900 to power off or otherwise consume less power from the batter(ies) 916. Furthermore, in addition to power off or down any of these software, firmware, and/or hardware components of the cart 900, the power-saving component 980 may be configured to power on or up each of these components in response to determining that a user is within the threshold distance of the cart 900.

The power-saving component 980 may determining whether a user is within the threshold distance of the cart 900 based on proximity data 978 generated by the proximity sensors 910. For instance, the power-saving component 980 may receive the proximity data 978 and analyze the proximity data to determine whether a user is within the threshold distance. In some instances, the proximity data 978 indicates, for each sensor or quadrant (or the like) of a sensor, the distance to a closest user or other object. Thus, the power-saving component 980 may determine whether the closest user/object is within the threshold distance and, if not, may send the instruction(s) for causing the component(s) to lessen their consumed power. Further, in some instances, the power-saving component 980 may input the proximity data 978 and/or additional sensor data generated at the same/similar time as the subject proximity data (e.g., image data 956, accelerometer data, etc.) into one or more trained models 982 for determining whether or not the object within the threshold distance of the cart corresponds to a user. If the trained model indicates that the object (or each object) detected by the proximity sensors 910 does not correspond to a user, but rather an inanimate object (e.g., a rack in the facility), then the power-saving component 980 may send the instruction(s) to lessen power consumed by the component(s) even if one or more (non-user) objects are detected within the threshold distance of the cart. It is to be appreciated that the trained model(s) may be trained by inputting training data in the form of labelled results (user, no user) and corresponding sensor data into the model during the training process. Of course, while one example is provided, the model(s) 982 may be trained in any other manner.

In addition, while the above example describes the proximity sensors 910 outputting proximity data 978 indicating the distance to a nearest object, in some instances the proximity sensors may output an indication when an object is within a threshold distance but not otherwise. For instance, a first proximity sensor may be configured to output an indication in response to detecting an object within one foot, while another proximity sensor (or quadrant of the same proximity sensor) may be configured to output an indication in response to detecting an object within two feet. Thus, these proximity sensors may output the respective indications in response to detecting an object within their respective threshold distances, but otherwise may refrain from outputting data to the power-saving component 980. Thus, the power-saving component 980 may cause the component(s) to power off and/or down based on not receiving an indication of an object within a threshold distance from the proximity sensors 910 for a threshold amount of time. In addition, the power-saving component 980 may cause the component(s) to power off and/or down in response to receiving an indication that each object detected by a proximity sensor 910 within a threshold distance within a certain amount of time does not correspond to a user, as determined by the trained model(s) 982.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

The invention claimed is:

1. A system comprising:
a fleet of mobile apparatuses, wherein a mobile apparatus of the fleet of mobile apparatuses comprises:
   a frame;
   a basket to receive an item;
   a weight sensor coupled between the basket and the frame, the weight sensor configured to generate first weight data representing a weight of an item being placed into the basket;
   an environment sensor coupled to the frame, the environment sensor configured to generate environment data representing conditions at an environment surrounding the mobile apparatus;
one or more processors; and
one or more computer-readable media storing instructions that, when executed by the one or more processors, cause the one or more processors to perform operations comprising:
   determining environmental conditions based on the environment data from the environment sensor;
   determining, in response to a predetermined weight being placed within the basket, a weight estimation based on second weight data from the weight sensor;
   determining, based on the predetermined weight and the weight estimation, an error;
   determining, based on the error, the environmental conditions, and the predetermined weight, a compensation model for the mobile apparatus, the compensation model configured to determine a compensated weight of the item based on the second weight data from the weight sensor compensated based on the environmental conditions; and
   conveying, to the fleet of mobile apparatuses, the compensation model for determining weights of items placed into baskets of the mobile apparatuses.

2. The system of claim 1, wherein:
the weight sensor comprises two or more load cells coupled between the frame and the basket;
the second weight data comprises load cell data from the two or more load cells; and
determining the compensation model further comprises:
   determining, prior to determining the weight estimation, a first center of gravity for the basket;
   determining, in response to determining the weight estimation, a second center of gravity for the basket;
   wherein determining the error comprises determining a location compensation factor based on the first center of gravity, the second center of gravity, and the predetermined weight; and
   determining the compensation model is further based on the location compensation factor.

3. The system of claim 1, further comprising:
a temperature sensor coupled to the frame; and
a relative humidity sensor within a housing of a user-facing module coupled to the frame, and wherein:
   the environment data comprises temperature data and relative humidity data; and
   determining the compensation model comprises:
      positioning the mobile apparatus in a chamber at a first temperature and a first relative humidity prior to the predetermined weight being placed within the basket, and wherein determining the error is further based on the first temperature and the first relative humidity.

4. The system of claim 1, wherein each mobile apparatus of the fleet of mobile apparatuses is configured to determine, based on respective weight data and the compensation model, a respective compensated weight value for a respective item placed in a respective basket.

5. A method, comprising:
receiving, at a computing device communicably coupled with a mobile apparatus, environment data;
determining, by the computing device, environmental conditions based on the environment data;
determining, by the computing device, a weight estimation based on weight data from a weight sensor of the mobile apparatus, wherein determining the weight estimation is in response to a predetermined weight being placed within a basket of the mobile apparatus;
determining, based on the predetermined weight and the weight estimation and by the computing device, an error;
determining, based on the error, the environmental conditions, and the predetermined weight, a compensation model for the mobile apparatus, the compensation model configured to determine a compensated weight of an item based on the environmental conditions; and
conveying, to a fleet of mobile apparatuses, the compensation model for determining weights of items placed into baskets of the mobile apparatuses.

6. The method as recited in claim 5, wherein:
the weight data comprises data from two or more load cells coupled to the basket; and
determining the compensation model comprises:
   determining a first center of gravity for the basket prior to the weight estimation; and
   determining, after the predetermined weight is added, a second center of gravity for the basket, wherein determining the compensation model is based on the first center of gravity, the second center of gravity, the error, and the predetermined weight.

7. The method as recited in claim 5, wherein:
the weight data comprises data from two or more load cells;
determining the compensation model comprises determining, prior to the predetermined weight being placed within the basket, a first location for placement of the predetermined weight within the basket; and
determining the compensation model is based on the first location, the predetermined weight, and the error.

8. The method as recited in claim 5, further comprising:
positioning the mobile apparatus in a chamber at a first temperature and a first humidity level prior to the predetermined weight being placed within the basket; and
wherein determining the compensation model is further based on the first temperature, the first humidity level, and the error.

9. The method as recited in claim 8, wherein determining the environment data comprises receiving temperature data from a temperature sensor coupled to a metal portion of a frame of the mobile apparatus.

10. The method as recited in claim 8, wherein determining the environment data comprises receiving relative humidity data from a humidity sensor within a housing of a user-facing module of the mobile apparatus.

11. The method as recited in claim 8, further comprising:
positioning the mobile apparatus in the chamber at a second temperature and a second humidity level prior to the predetermined weight being placed within the basket a second time; and
determining a second error based on the weight estimation and the predetermined weight, and wherein determining the compensation model is further based on the second temperature, the second humidity level, and the second error.

12. The method as recited in claim 5, further comprising:
receiving second weight data after determining the compensation model;
determining adjusted weight data based on the second weight data and the compensation model; and
determining an item and a price to add to a virtual cart of a customer based on the adjusted weight data.

13. The method as recited in claim 5, further comprising:
determining, by a second computing device, second conditions associated with a second mobile apparatus;
receiving, at a second computing device communicably coupled with the second mobile apparatus, second weight data;
determining, by the second computing device, a second weight estimation based on the second weight data, wherein determining the weight estimation is in response to a second predetermined weight being placed within a second basket of the second mobile apparatus; and
determining, by the second computing device and based on the second predetermined weight and the second weight estimation, a second error, wherein determining the compensation model is further based on the second predetermined weight, the second error, and the second conditions.

14. The method as recited in claim 5, wherein the compensation model comprises a machine learning model based on an ordinary least squares regression model.

15. The method as recited in claim 5, wherein each mobile apparatus of the fleet of mobile apparatuses is configured to determine, based on respective weight data and the compensation model, a respective compensated weight value for a respective item placed in a respective basket.

16. A method comprising:
receiving, from a mobile apparatus, environment data;
receiving, from the mobile apparatus, weight sensor data;
determining a weight estimation of an item placed in a basket of the mobile apparatus based on the weight sensor data;
determining a correction factor by at least inputting the environment data into a first machine learning model;
determining, based on the correction factor and the weight estimation, a compensated weight of the item; and
updating a virtual cart associated with the mobile apparatus to include an identifier of the item.

17. The method as recited in claim 16, wherein:
the weight sensor data comprises data from two or more load cells coupled to the basket; and
determining the correction factor comprises:
determining a location for the item within the basket of the mobile apparatus; and
inputting the location into the first machine learning model.

18. The method as recited in claim 16, wherein receiving the environment data comprises:
determining temperature data; and
determining humidity data, and wherein determining the correction factor comprises inputting the temperature data and the humidity data into the first machine learning model.

19. The method as recited in claim 16, wherein the first machine learning model is trained to output the correction factor using training data produced by annotating weight sensor data for a sample mobile apparatus having a structure similar to the mobile apparatus with sample environment data and sample correction factor data.

20. The method as recited in claim 16, wherein determining the compensated weight of the item comprises inputting the environment data and the weight sensor data into the first machine learning model trained to output the compensated weight of the item using training data produced by annotating weight sensor data from a sample mobile apparatus having a structure similar to the mobile apparatus with sample environment data and sample compensated weight data.

* * * * *